(12) United States Patent
Filos et al.

(10) Patent No.: US 12,141,498 B2
(45) Date of Patent: Nov. 12, 2024

(54) SELECTIVE ADJUSTMENT OF SOUND PLAYBACK

(71) Applicant: QUALCOMM Incorporated, San Diego, CA (US)

(72) Inventors: Jason Filos, San Diego, CA (US); Ferdinando Olivieri, San Diego, CA (US); Nils Gunther Peters, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 117 days.

(21) Appl. No.: 17/755,912

(22) PCT Filed: Nov. 17, 2020

(86) PCT No.: PCT/US2020/060920
§ 371 (c)(1),
(2) Date: May 11, 2022

(87) PCT Pub. No.: WO2021/118770
PCT Pub. Date: Jun. 17, 2021

(65) Prior Publication Data
US 2022/0382509 A1   Dec. 1, 2022

(30) Foreign Application Priority Data
Dec. 12, 2019  (GR) .............................. 20190100555

(51) Int. Cl.
*G06F 3/16*        (2006.01)
*H04S 7/00*        (2006.01)
(52) U.S. Cl.
CPC .............. *G06F 3/165* (2013.01); *G06F 3/167* (2013.01); *H04S 7/302* (2013.01); *H04R 2430/01* (2013.01)

(58) Field of Classification Search
CPC .......... G06F 3/165; G06F 3/167; G06F 3/107; H04S 7/302; H04S 7/303; H04S 2400/13;
(Continued)

(56) References Cited

U.S. PATENT DOCUMENTS

2013/0259238 A1* 10/2013 Xiang ...................... H04R 5/04
                                                         381/17
2018/0352334 A1* 12/2018 Family ................... H04R 1/403
(Continued)

FOREIGN PATENT DOCUMENTS

WO   WO-2018213401 A1 * 11/2018 ............... B32B 7/12

OTHER PUBLICATIONS

Device and Method for Spatially Selective Audio Playback Patent No. 20160007584 (Franck Andreas); Jan. 20, 2016 Document ID.*
(Continued)

*Primary Examiner* — Yogeshkumar Patel
(74) *Attorney, Agent, or Firm* — QUALCOMM Incorporated

(57) ABSTRACT

A device for managing sound playback includes one or more processors configured to receive an indication of a user-device interaction between a user and an audio interface device during a sound playback operation of a multi-speaker audio playback system. The one or more processors are also configured to, based on receiving the indication of the user-device interaction, initiate a selective adjustment of the sound playback operation to reduce a playback sound of the multi-speaker audio playback system based on a position of the user.

30 Claims, 10 Drawing Sheets

(58) Field of Classification Search
CPC ...... H04R 3/12; H04R 1/403; H04R 2499/13; H04R 2227/005; H04R 2400/13; H04R 2430/01; H04R 27/00
USPC .......................................................... 700/94
See application file for complete search history.

(56) References Cited

U.S. PATENT DOCUMENTS

2019/0173687 A1* 6/2019 MacKay ................. G06F 3/165
2019/0394569 A1* 12/2019 Moore ................. H04R 29/002

OTHER PUBLICATIONS

International Search Report and Written Opinion—PCT/US2020/060920—ISA/EPO—Feb. 2, 2021.
Olivieri et al., "Comparison of Strategies for Accurate Reproduction of a Target Signal with Compact Arrays of Loudspeakers for the Generation of Zones of Private Sound and Silence", Journal of the Audio Engineering Society vol. 64, No. 11, Nov. 2016, pp. 905-917.
Betlehem, et al., "Personal sound zones: Delivering interface free audio to multiple listeners", IEEE Signal Processing Magazine, vol. 32, Issue 2, Sep. 19, 2014, pp. 81-91.

* cited by examiner

SELECTIVE ADJUSTMENT OF SOUND PLAYBACK

I. CROSS-REFERENCE TO RELATED APPLICATIONS

The present application claims priority from Greece Provisional Patent Application No. 20190100555, filed Dec. 12, 2019, entitled "SELECTIVE ADJUSTMENT OF SOUND PLAYBACK," which is incorporated by reference in its entirety.

II. FIELD

The present disclosure is generally related to sound playback.

III. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

A computing device can include an audio interface device, such as a home automation system, that is voice-activated or that outputs audio (e.g., a weather update) for a user. Sound playback by another audio system, such as a home entertainment system, can interfere with operation of the audio interface device. For example, the audio interface device may experience errors in distinguishing the speech of the user from the playback sound of the home entertainment system. As another example, the user may be unable to hear the output from the audio interface device over the playback sound of the home entertainment system. The interference with the operation of the audio interface device can adversely impact user experience.

IV. SUMMARY

In a particular aspect, a device for managing sound playback includes one or more processors configured to receive an indication of a user-device interaction between a user and an audio interface device during a sound playback operation of a multi-speaker audio playback system. The one or more processors are also configured to, based on receiving the indication of the user-device interaction, initiate a selective adjustment of the sound playback operation to reduce a playback sound of the multi-speaker audio playback system based on a position of the user.

In another particular aspect, a method of sound playback includes receiving, at a device, an indication of a user-device interaction between a user and an audio interface device during a sound playback operation of a multi-speaker audio playback system. The method also includes, based on receiving the indication of the user-device interaction, initiating, at the device, a selective adjustment of the sound playback operation to reduce a playback sound based on a position of the user.

In another particular aspect, a computer-readable storage device stores instructions that, when executed by one or more processors, cause the one or more processors to receive an indication of a user-device interaction between a user and an audio interface device during a sound playback operation of a multi-speaker audio playback system. The instructions, when executed by the one or more processors, also cause the one or more processors to, based on receiving the indication of the user-device interaction, initiate a selective adjustment of the sound playback operation to reduce a playback sound based on a position of the user.

In another particular aspect, an apparatus includes means for receiving an indication of a user-device interaction between a user and an audio interface device during a sound playback operation of a multi-speaker audio playback system. The apparatus also includes means for initiating a selective adjustment of the sound playback operation to reduce a playback sound based on a position of the user, the selective adjustment initiated based on receiving the indication of the user-device interaction.

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Systems and methods of selective adjustment of sound playback are disclosed. A multi-speaker audio playback system performs sound playback of a playback signal (e.g., music). A user-device interaction is detected between a user and an audio interface device during the sound playback of the multi-speaker audio playback system. For example, the user-device interaction includes the user speaking a voice-activation keyword (e.g., "Hello Assistant") of the audio interface device or the user making a particular gesture to wake up the audio interface device. A computing device initiates selective adjustment of the sound playback based on a position of the user. In a particular example, the selective adjustment is performed by deactivating speakers that are closest to the position of the user. In another example, beamforming is used to perform the selective adjustment. The selective adjustment of the sound playback reduces the playback sound at the position of the user, at the position of the audio interface device, or both. In a particular example, the selective adjustment does not reduce the playback sound at positions of other users. To illustrate, if the user is detected in a driver seat of a car, the selective adjustment is performed so that the playback sound of the multi-speaker audio playback system is reduced at the driver seat and not reduced for passengers in the car.

The operation of the audio interface device is improved because of the selective adjustment of the playback sound. In a particular example, the audio interface device experiences fewer errors (e.g., no errors) in recognizing the speech of the user because the playback sound is not received (or is received at reduced volume) from the same location where the speech of the user is received. In another example, when the playback sound is reduced at the position of the user, the user is better able to hear an output of the audio interface.

Figure 1:
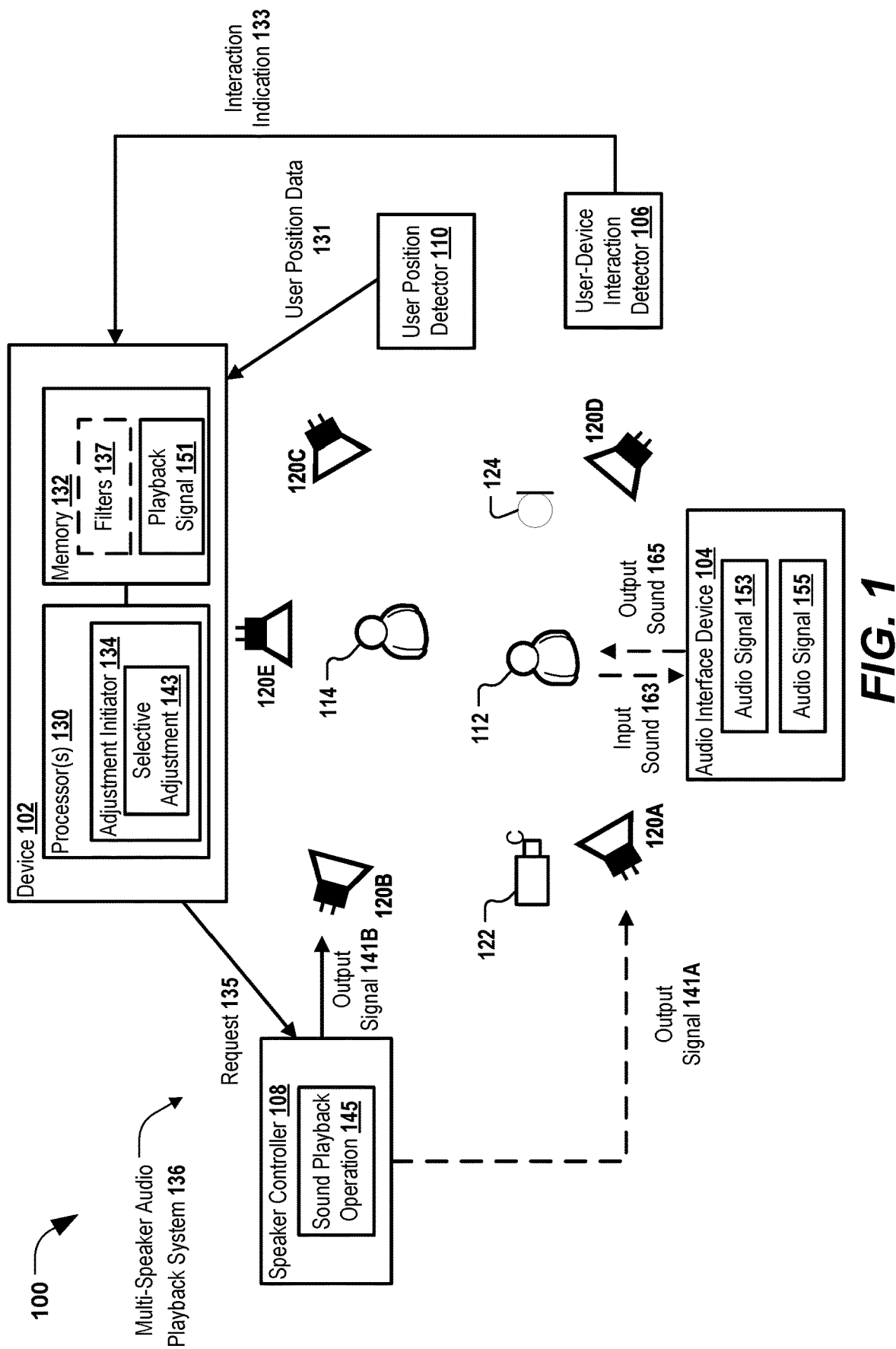
FIG. 1 is a block diagram of a particular illustrative aspect of a system operable to perform selective adjustment of sound playback.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 1 depicts a device 102 including one or more processors ("processor(s)" 130 in FIG. 1), which indicates that in some implementations the device 102 includes a single processor 130 and in other implementations the device 102 includes multiple processors 130. For ease of reference herein, such features are generally introduced as "one or more" features and are subsequently referred to in the singular unless aspects related to multiple of the features are being described.

It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

Referring to FIG. 1, a particular illustrative aspect of a system operable to perform selective adjustment of sound playback is disclosed and generally designated 100. The system 100 includes a device 102 that is coupled to a user-device interaction detector 106, a speaker controller 108, a user position detector 110, or a combination thereof. The system 100 also includes an audio interface device 104, a camera 122, a microphone 124, or a combination thereof. A multi-speaker audio playback system 136 includes the speaker controller 108 (e.g., a beamforming-capable speaker system) and a plurality of speakers 120. The multi-speaker audio playback system 136 is illustrated as including five speakers 120A-120E in FIG. 1 as an illustrative example. In other examples, the multi-speaker audio playback system 136 can include fewer than five speakers or more than five speakers.

The device 102, the audio interface device 104, the user-device interaction detector 106, the speaker controller 108, the user position detector 110, the camera 122, the microphone 124, and the speakers 120 are illustrated in FIG. 1 as separate devices as an illustrative example. In other implementations, two or more of the device 102, the audio interface device 104, the user-device interaction detector 106, the speaker controller 108, the user position detector 110, the camera 122, the microphone 124, or the speakers 120 are integrated into a single device. In a particular aspect, one or more of the device 102, the audio interface device 104, the user-device interaction detector 106, the speaker controller 108, the user position detector 110, the camera 122, the microphone 124, or the speakers 120 include or are integrated into a computing device, a voice assistant, an internet-of-things (IoT) controller, an IoT device, a car, a vehicle, an integrated assistant application, a climate control system, a light system, an electrical system, a sprinkler system, a home automation system, a security system, an appliance, a playback device, a television, a media device, a virtual reality (VR) headset, an augmented reality (AR) headset, a mixed reality (MR) headset, an extended reality (XR) headset, a head-mounted display (HMD), an audio device, a wireless speaker and voice activated device, or a combination thereof.

It should be noted that in the following description, various functions performed by the system 100 of FIG. 1 are described as being performed by certain components or modules. However, this division of components and modules is for illustration only. In an alternate aspect, a function described herein as performed by a particular component or module may be divided amongst multiple components or modules. Moreover, in an alternate aspect, two or more components or modules of FIG. 1 may be integrated into a single component or module. Each component or module illustrated in FIG. 1 may be implemented using hardware (e.g., a field-programmable gate array (FPGA) device, an application-specific integrated circuit (ASIC), a digital signal processor (DSP), a controller, etc.), software (e.g., instructions executable by a processor), or any combination thereof.

The audio interface device 104 includes a speaker, a microphone, or both. The audio interface device 104 is configured to receive an audio signal 153 from a user 112 (e.g., via a microphone), output an audio signal 155 (e.g., via a speaker), or both. In some examples, one or more microphones of the audio interface device 104 capture an input sound 163 corresponding to speech of the user 112 and provide the audio signal 153 representing the input sound 163 to the audio interface device 104. In some examples, the audio interface device 104 provides the audio signal 155 to one or more speakers and the speakers generate an output sound 165 corresponding to the audio signal 155. In implementations in which the audio interface device 104 includes one or more microphones, the audio interface device 104 may be configured to engage in user interactions in which the audio interface device 104 receives an audio signal 153 (e.g., "Hello Assistant, set the temperature to 70 degrees") without outputting any audio signal. In implementations in which the audio interface device 104 includes one or more speakers, the audio interface device 104 may be configured to engage in user interactions in which the audio interface device 104 outputs an audio signal 155 (e.g., "your morning commute has regular traffic today") without receiving any audio signal. In implementations in which the audio interface device 104 includes one or more speakers and one or more microphones, the audio interface device 104 may further be configured to engage in user interactions in which the audio interface device 104 receives an audio signal 153 (e.g., "Hello Assistant, what time is it?") and outputs an audio signal 155 (e.g., "It is 3 pm").

The user position detector 110 is configured to determine a user position data 131 indicating a position of a user 112. The user position data 131 can indicate an actual position (e.g., coordinates) of the user 112, a relative position (e.g., direction or distance from another object) of the user 112, or both. In a particular example, the user position detector 110 is configured to perform a direction of arrival analysis on a portion (e.g., "Hello Assistant") of the audio signal 153 received by the audio interface device 104 to generate the user position data 131 indicating a position of the user 112 relative to the audio interface device 104. In some examples, the user position detector 110 is configured to receive global positioning system (GPS) coordinates from a mobile device associated with the user 112 and to generate the user position data 131 indicating the GPS coordinates.

The user-device interaction detector 106 is configured to generate an interaction indication 133 in response to detecting a user-device interaction of a user 112 with the audio interface device 104. In a particular example, the user-device interaction detector 106 is configured to detect the user-device interaction in response to determining that a portion of the audio signal 153 corresponds to an activation command (e.g., "Hello Assistant"). In some examples, the user-device interaction detector 106 is configured to detect the user-device interaction in response to determining that one or more images captured by a camera of the audio interface device 104 indicate that the user 112 performed an activation gesture (e.g., a handwave).

The speaker controller 108 is configured to perform a sound playback operation 145 corresponding to a playback signal 151 (e.g., a television audio output, a music system output, etc.) that may be received from the device 102 or that may be received from another source. For example, the speaker controller 108 is configured to provide output signals 141 corresponding to the playback signal 151 to the speakers 120. Although a first output signal 141A provided to a first speaker 120A and a second output signal 141B provide to a second speaker 120B are depicted for purpose of illustration, it should be understood that other output signals may be provided to the other speakers, as described further below. In a particular aspect, the speaker controller 108 is configured to support various spatial audio configurations, such as a stereo configuration, a 5.1 surround sound configuration, a 7.1 surround sound configuration, or another type of spatial audio configuration. In a particular example, the playback signal 151 is encoded for a particular spatial audio configuration, and the speaker controller 108 generates the output signals 141 corresponding to the particular audio configuration based on the playback signal 151. In another example, the playback signal 151 corresponds to a mono signal and the speaker controller 108 generates the output signals 141 corresponding to a particular spatial audio configuration by performing audio processing of the mono signal.

The device 102 includes one or more processors 130 coupled to a memory 132. The processor 130 includes an adjustment initiator 134. In a particular aspect, the processor 130 is included in an integrated circuit. The adjustment initiator 134 is configured to, responsive to receiving the interaction indication 133, initiate a selective adjustment 143 of the sound playback operation 145 based on the user position data 131. In a particular example, the selective adjustment 143 includes adjusting an output level (e.g., volume) of some, but not all, of the speakers 120. In a particular aspect, the selective adjustment 143 includes deactivating one or more of the speakers 120 that are closer to the user 112. In a particular aspect, the selective adjustment 143 includes creating a "silent" zone. In the silent zone, the playback sound of the sound playback operation 145 is reduced (e.g., silent) as compared to outside the silent zone. In a particular aspect, beamforming techniques are used to create the silent zone, such as by adjusting one or more of the output signals 141 so that sounds output by one or more speakers destructively interfere with each other within the silent zone (e.g., without causing substantial destructive interference outside of the silent zone).

During operation, the speaker controller 108 initiates a sound playback operation 145 corresponding to the playback signal 151. In an example, the playback signal 151 corresponds to an output of a home entertainment system. To illustrate, the playback signal 151 may correspond to an audio output of a movie that a user 112 and a user 114 are watching. The speaker controller 108, during the sound playback operation 145, generates output signals 141 corresponding to the playback signal 151 and provides the output signals 141 to the speakers 120. In a particular example, the speaker controller 108 provides an output signal 141A, an output signal 141B, an output signal 141C (not shown), an output signal 141D (not shown), and an output signal 141E (not shown) to a speaker 120A, a speaker 120B, a speaker 120C, a speaker 120D, and a speaker 120E, respectively. The output signals 141 can be based on configuration settings (e.g., a surround sound configuration, a channel balance setting, etc.) of the multi-speaker audio playback system 136, configuration settings of the speaker controller 108, configuration settings of the speakers 120, or a combination thereof. The speaker controller 108 sending the output signals 141 to five speakers is provided as an illustrative example. In other examples, the speaker controller 108 can provide the output signals 141 to fewer than five speakers or to more than five speakers.

The user-device interaction detector 106 detects a user-device interaction between the user 112 and the audio interface device 104. In a particular aspect, the user-device interaction is performed by the user 112 to activate the audio interface device 104. In an example, the user-device interaction detector 106 detects the user-device interaction in response to determining that a portion of an audio signal 153 (e.g., representative of the input sound 163) received at the audio interface device 104 corresponds to an activation command (e.g., "Hello Assistant") that activates the audio interface device 104. In this example, the user-device interaction includes receipt, at the audio interface device 104, of the speech of the user (e.g., the input sound 163) corresponding to the activation command. In another example, the user-device interaction detector 106 detects the user-device interaction in response to determining that one or more images captured by the camera 122 indicate that a user 112 made an activation gesture (e.g., waved a hand) that activates the audio interface device 104. In this example, the user-device interaction includes the user gesture (e.g., the activation gesture) indicated in the one or more images.

In a particular aspect, the user-device interaction is based on a proximity of the user 112 to one or more of the audio interface device 104, the microphone 124, or the camera 122. In some examples, the user-device interaction detector 106 detects the user-device interaction in response to determining that a portion of an audio signal 153 received at the audio interface device 104 (or an audio signal received at the microphone 124) corresponds to user speech received from a user that is within a threshold distance of the audio interface device 104 (or the microphone 124). In another example, the user-device interaction detector 106 detects the user-device interaction in response to determining that one or more images captured by the camera 122 indicate that the user 112 is detected within a threshold distance of the audio interface device 104, the camera 122, or both. Audio signals and camera images are provided as illustrative examples for determining the proximity of the user 112 to one or more of the audio interface device 104, the microphone 124, or the camera 122. In other examples, the proximity of the user 112 can be determined based on other information, such as GPS coordinates of a mobile device of the user 112. The user-device interaction detector 106, in response to detecting the user-device interaction, provides an interaction indication 133 to the device 102.

In response to receiving the interaction indication 133, the adjustment initiator 134 retrieves user position data 131 of the user 112. In some implementations, the user position detector 110 performs one or more operations similar to the operations described with reference to the user-device interaction detector 106 to determine the user position data 131. In other implementations, the user position detector 110 determines the user position data 131 in a manner that is different than the user-device interaction detector 106. For example, the user-device interaction detector 106 may determine the proximity of the user 112 to the camera 122 based on determining that one or more images indicate that the user 112 is detected within a threshold distance of the audio interface device 104, of the camera 122, or both, whereas the user position detector 110 may determine the user position data 131 based on GPS coordinates of a user device associated with the user 112. In a particular aspect, the user-device interaction detector 106 detects the user-device interaction without determining a proximity of the user 112 to another object, and the user position detector 110 determines the user position data 131.

The user position data 131 includes a geographic position (e.g., coordinates) or a relative position of the user 112. In a particular aspect, the user position data 131 indicates a direction, a distance, or both, of the user 112 relative to one or more of the audio interface device 104, the camera 122, the microphone 124, or the speakers 120. In some examples, the user position detector 110 performs audio analysis (e.g., direction of arrival (DoA) analysis) of an audio signal 153 (e.g., "Hello Assistant") received at one or more microphones of the audio interface device 104 to determine a direction, a distance, or both, of the user 112 relative to the audio interface device 104. The user position detector 110 determines the user position data 131 based on the direction, the distance, or both, of the user 112 relative to the audio interface device 104. In a particular aspect, the user position detector 110 has access to positions of the speakers 120 relative to the audio interface device 104. In this aspect, the user position detector 110 determines the user position data 131 of the user 112 relative to the speakers 120 based on the direction, the distance, or both, of the user 112 relative to the audio interface device 104 and the positions of the speakers 120 relative to the audio interface device 104.

The adjustment initiator 134, in response to receiving the interaction indication 133, initiates a selective adjustment 143 of the sound playback operation 145 based on the user position data 131. For example, the adjustment initiator 134 performs the selective adjustment 143 to improve user experience by reducing a likelihood of audio interference between the output signals 141 and speech of the user 112 (e.g., corresponding to a remaining portion of the audio signal 153), reducing a likelihood of audio interference between the output signals 141 and an audio signal 155 that is to be output by the audio interface device 104, or both. In a particular example, the user position detector 110 determines that the user position data 131 indicates that the user 112 is closer to a speaker 120A and a speaker 120D as compared to a speaker 120B, a speaker 120C, and a speaker 120E. The user position detector 110 initiates the selective adjustment 143 in response to determining, based on the user position data 131, that output from the speakers 120 during the sound playback operation 145 is likely to interfere with operation of the audio interface device 104.

Figure 2A:
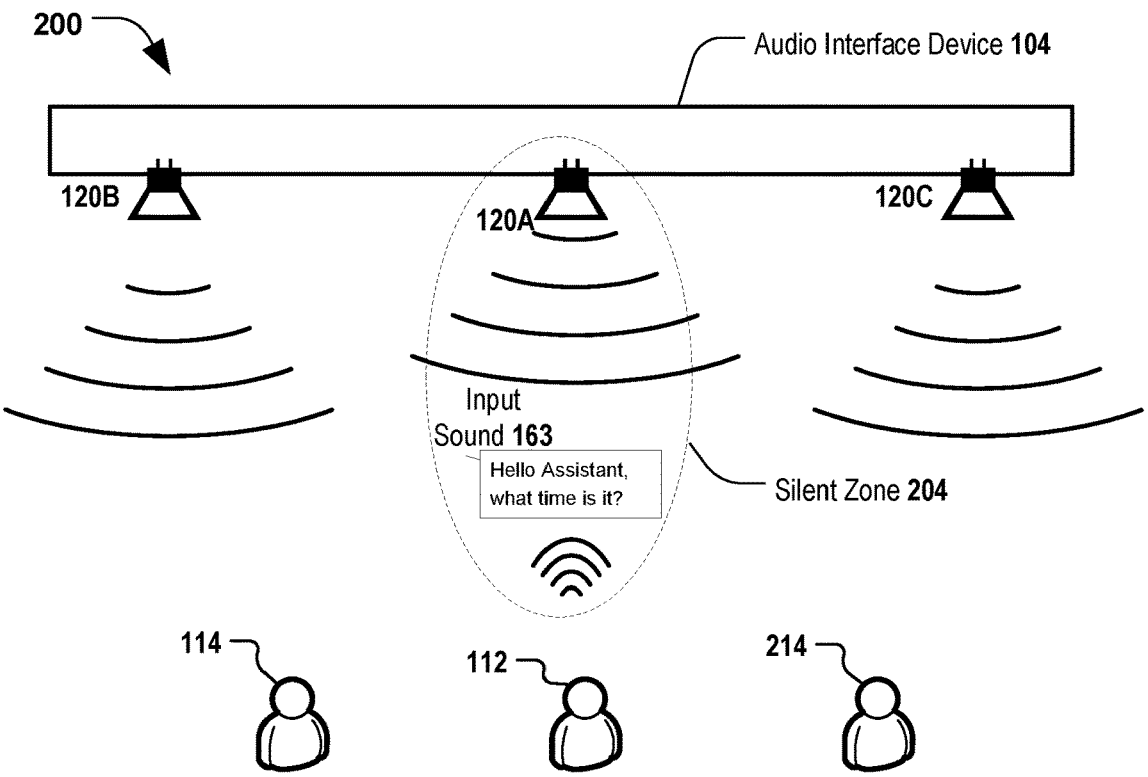
FIG. 2A is an illustrative example of a speaker configuration of the system of FIG. 1.
Figure 2B:
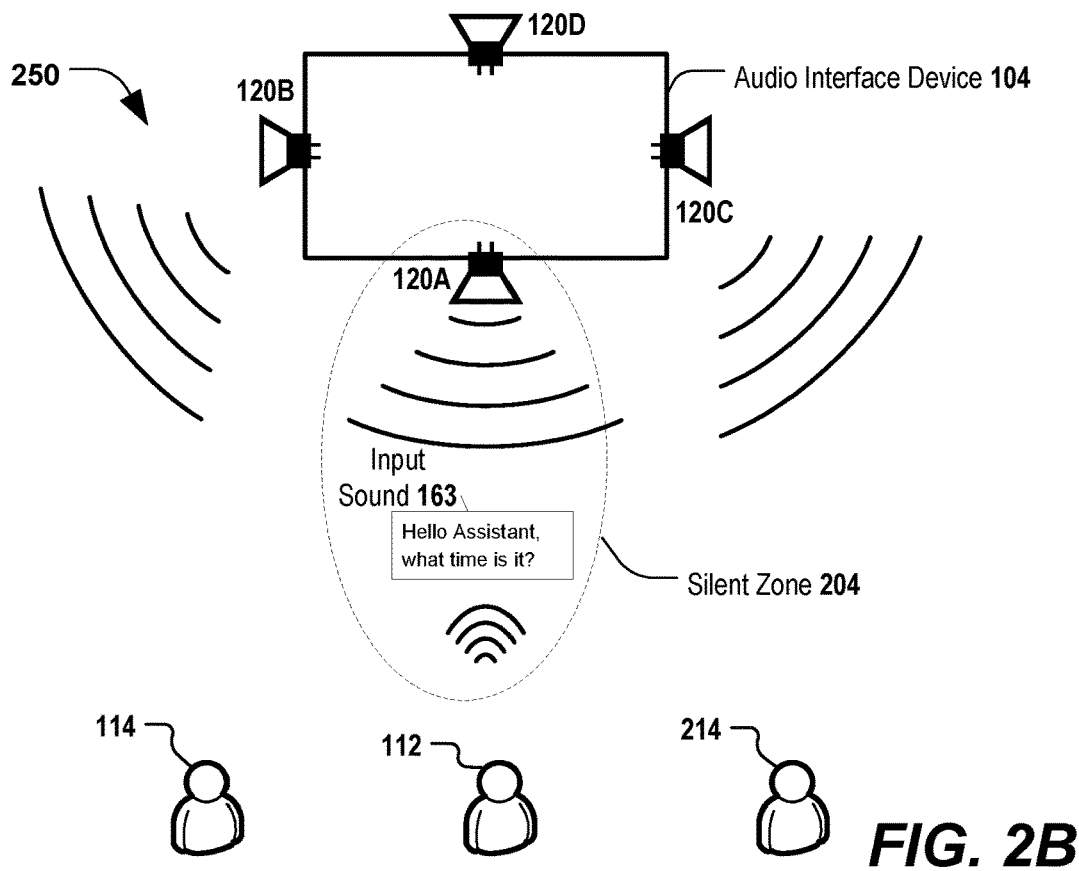
FIG. 2B is another illustrative example of a speaker configuration of the system of FIG. 1.

In some implementations, the selective adjustment 143 includes beamforming to create a silent zone, such a described further with reference to the examples of FIG. 2A and FIG. 2B. In other implementations, the selective adjustment 143 includes deactivating or otherwise reducing sound from one or more speakers to create a silent zone, such as described further with reference to FIG. 5. In some examples, the selective adjustment 143 reduces audio interference between speech of the user 112 corresponding to a portion (e.g., "what time is it?") of the audio signal 153 and output of each of the speaker 120A and the speaker 120D. In some example, the selective adjustment 143 reduces audio interference between the output sound 165 corresponding to the audio signal 155 and output of each of the speaker 120A and the speaker 120D.

In a particular aspect, the selective adjustment 143 includes generating or updating one or more filters 137 based on the user position data 131. The one or more filters 137 are applied to the output signals 141 to generate one or more filtered audio signals prior to providing the filtered audio signals to the speakers 120. In a particular example, a filter 137A (not shown) is applied to a portion of an output signal 141A prior to providing the filtered portion of the output signal 141A to the speaker 120A. As another example, a filter 137D (not shown) is applied to a portion of an output signal 141D prior to providing the filtered portion of the output signal 141D to the speaker 120D. In a particular aspect, the filters 137 are based on a beamforming technique.

In a particular aspect, the selective adjustment 143 includes adjusting one or more parameters associated with a portion of audio prior to streaming the portion of audio to the multi-speaker audio playback system 136. In a particular example, one or more parameters associated with a portion of an output signal 141A (such as beamforming weights) are adjusted prior to providing the portion of the output signal 141A to the speaker 120A so that sounds projected by the speaker 120A cause destructive interference with sounds projected by the speaker 120B, sounds projected by the speaker 120E, sounds projected by the speaker 120C, or a combination thereof. In some examples, gain parameters associated with a portion of an output signal 141A are adjusted prior to providing the portion of the output signal 141A to the speaker 120A so that a volume of sound projected by the speaker 120A is reduced.

In some implementations, rather than generating or performing the selective adjustment at the device 102, the adjustment initiator 134 initiates the selective adjustment 143 by providing the user position data 131 to the speaker controller 108, such as via a request 135 (e.g., an adjustment request) that includes the user position data 131, and the speaker controller 108 performs the selective adjustment 143. In other implementations, the adjustment initiator 134 initiates the selective adjustment 143 by generating the filters 137 (or parameters) based on the user position data 131 and providing the filters 137 (or parameters) to the speaker controller 108 via the request 135. In this aspect, the speaker controller 108 applies the filters 137 (or parameters) to portions of the output signals 141. In some implementations in which the device 102 provides the output signals 141 to the speaker controller 108, the adjustment initiator 134 initiates the selective adjustment 143 by filtering (or adjusting) portions of one or more of the output signals 141 based on the filters 137 (or parameters). To illustrate, the adjustment initiator 134 may provide, via the request 135, the filtered (adjusted) portions of the one or more of the output signals 141 and unfiltered (or unadjusted) portions of others of the output signals 141 to the speaker controller 108. Thus, the request 135 (e.g., an adjustment request) sent from the adjustment initiator 134 to the speaker controller 108 may indicate the user position data 131, the filters 137, the parameters, the filtered (or adjusted) portions of the one or more of the output signals 141, the unfiltered (or unadjusted) portions of others of the output signals 141, or a combination thereof.

The speaker controller 108 outputs the filtered (or adjusted) portions of the one or more of the output signals 141, the unfiltered (or unadjusted) portions of others of the output signals 141, or a combination thereof. In a particular example in which the speakers 120A and 120D are closest to the user 112 and the audio interface device 104, the speaker controller 108 creates a silent zone in the vicinity of the user 112 and the audio interface device 104 by providing a filtered (or adjusted) portion of the output signal 141A to the speaker 120A and a filtered (or adjusted) portion of an output signal 141D to the speaker 120D, and also provides an unfiltered (or unadjusted) portion of the output signal 141B to the speaker 120B, an unfiltered (or unadjusted) portion of an output signal 141C to the speaker 120C, and an unfiltered (or unadjusted) portion of the an output signal 141E to the speaker 120E.

In a particular aspect, the audio interface device 104, subsequent to the selective adjustment 143, receives the audio signal 153 (e.g., a portion of the audio signal 153) corresponding to speech of the user 112 (e.g., "what time is it?"). The audio signal 153 (e.g., the portion of the audio signal 153) has reduced interference (e.g., no interference) from the sounds projected by the speakers 120 responsive to the output signals 141 of the sound playback operation 145. In a particular aspect, the audio interface device 104 outputs the audio signal 155 subsequent to the selective adjustment 143. The user 112 is able to hear the output sound 165 corresponding to the audio signal 155 with reduced interference (e.g., no interference) from sound corresponding to the output signals 141 output by the speakers 120. In a particular aspect, the listening experience of the user 114 and other users outside of the silent zone is relatively unchanged (e.g., completely unchanged) subsequent to the selective adjustment 143.

The system 100 thus improves user experience of the user 112 by reducing interference in the operation of the audio interface device 104 by the sound playback operation 145 without impacting a listening experience of the user 114. For example, the user 112 has an improved user experience (e.g., with reduced interference) with the audio interface device 104 while the user 114 can continue to listen to the sound playback of a home entertainment system.

Referring to FIG. 2A, a system 200 includes an example of the audio interface device 104 (e.g., a sound bar) that also includes a speaker 120A, a speaker 120B, and a speaker 120C. In other examples, the audio interface device 104 can include fewer than three speakers or more than three speakers. As illustrated, the audio interface device 104 is configured to incorporate the functionality described with reference to the device 102, the user-device interaction detector 106, the speaker controller 108, and the user position detector 110 of FIG. 1. However, in other implementations, one or more operations described with reference to the device 102, the user-device interaction detector 106, the speaker controller 108, or the user position detector 110 can be performed by another device that is external to the audio interface device 104.

In the system 200, the audio interface device 104 is configured to perform the selective adjustment 143 that results in creation of a silent zone 204 between the speaker 120A and the user 112. For example, the selective adjustment 143 refrains from reducing an output of the speaker 120B and the speaker 120C. An output of the speaker 120A cancels (e.g., based on noise cancellation techniques) an output of the speaker 120B and the speaker 120C in an area between the speaker 120A and the user 112, such as further described with reference to FIG. 3C. The silent zone 204 reduces an audio interference between speech of the user 112 (e.g., the input sound 163) corresponding to a portion (e.g., "what time is it?") of the audio signal 153 and output of each of the speaker 120B and the speaker 120C. For example, the selective adjustment 143 includes reducing the sound output of the speaker 120B and the speaker 120C as perceived at a position of the user 112, the speaker 120A, or both, while refraining from reducing sound output from the speaker 120B and the speaker 120C as perceived at positions of the user 114 and a user 214, respectively. In this example, the listening experience of the user 114 and the user 214 is relatively unchanged (e.g., not changed at all), while reducing the interference with the speech of the user 112. In a particular aspect, the selective adjustment 143 is initiated responsive to detecting an activation word (e.g., "Hello Assistant") in a first portion of the audio signal 153 so that a remaining portion of the audio signal 153 (e.g., "what time is it?") can be received with reduced interference (e.g., no interference) from the sound playback operation 145.

Referring to FIG. 2B, a system 250 includes another example of the audio interface device 104 (e.g., a voice assistant device) that includes a speaker 120A, a speaker 120B, a speaker 120C, and a speaker 120D. In other examples, the audio interface device 104 can include fewer than three speakers or more than three speakers. The selective adjustment 143 includes creation of the silent zone 204 between the speaker 120A and the user 112. For example, an output of the speaker 120A may substantially cancel output of one or more of the speaker 120B, the speaker 120C, and the speaker 120D between the speaker 120A and the user 112, such as further described with reference to FIG. 3C.

The systems 200 and 250 thus improve user experience of the user 112 by reducing interference in the operation of the audio interface device 104 by the sound playback operation 145 without impacting a listening experience of the user 114 and the user 214. For example, the user 112 has an improved user experience (e.g., with reduced interference) while interacting with the audio interface device 104 without substantially impacting the listening experience of the user 114 and the user 214.

Figure 3A:
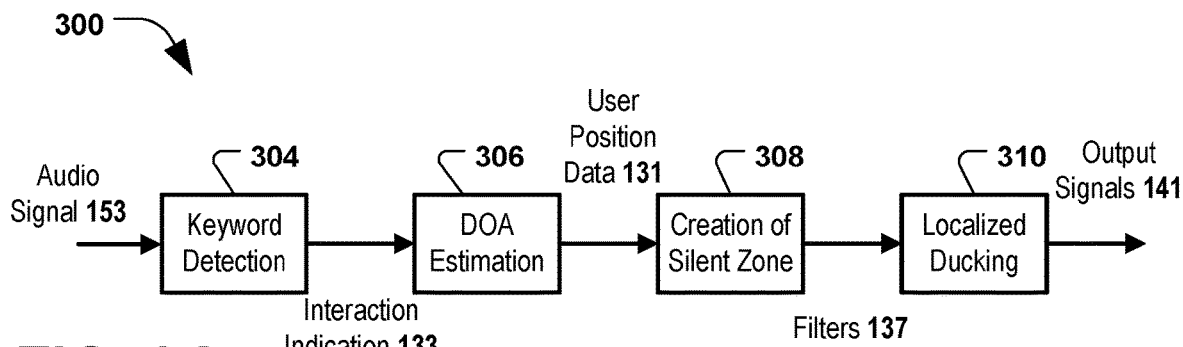
FIG. 3A is an illustrative example of operations that may be performed by the system of FIG. 1.

Referring to FIG. 3A, an example 300 of operations that may be performed by the system 100 of FIG. 1 is shown. In a particular aspect, one or more of the operations of the example 300 are performed by the device 102, the processor 130, the adjustment initiator 134, the speaker controller 108, the audio interface device 104, the user position detector 110, the user-device interaction detector 106, the system 100 of FIG. 1, or a combination thereof.

In a particular example, the user-device interaction detector 106 of FIG. 1 performs keyword detection 304. To illustrate, the user-device interaction detector 106 detects an activation command (e.g., a keyword, such as "Hello Assistant") in a portion of the audio signal 153, as described with reference to FIG. 1. The user-device interaction detector 106, in response to detecting the activation command (e.g., "Hello Assistant") generates an interaction indication 133.

The user position detector 110 determines a user position data 131, as described with reference to FIG. 1, in response to receiving the interaction indication 133. In a particular example, the user position detector 110 determines the user position data 131 by performing DOA estimation 306 based on the portion of the audio signal 153 that includes the activation command.

The adjustment initiator 134 generates the filters 137 based on the user position data 131, as described with reference to FIG. 1. For example, the adjustment initiator 134 performs operations associated with creation of a silent zone 308 by using beamforming techniques to generate the filters 137 based on the user position data 131 such that a silent zone is created at the position of the user 112 upon playout of audio data that has been filtered by the filters 137. In other examples, the adjustment initiator 134 generates the filters 137 to create the silent zone by reducing or deactivating sound output of the closest speaker(s) to user position instead of, or in addition to, performing beamforming.

The speaker controller 108 performs localized ducking 310 by applying the filters 137 to portions of one or more of the output signals 141 and providing the filtered portions of the one or more of the output signals 141 to corresponding speakers for playout. As used herein, "ducking" refers to reducing a sound level (e.g., volume) of one or more of the output signals 141 in a silent zone. In a particular aspect, ducking is performed using beamforming, as further described with reference to FIG. 3C. In a particular aspect, ducking is performed by adjusting gain levels, as further described with reference to FIG. 4. In a particular aspect, ducking is performed by deactivating one or more speakers, as further described with reference to FIGS. 5A-5B.

Figure 3B:
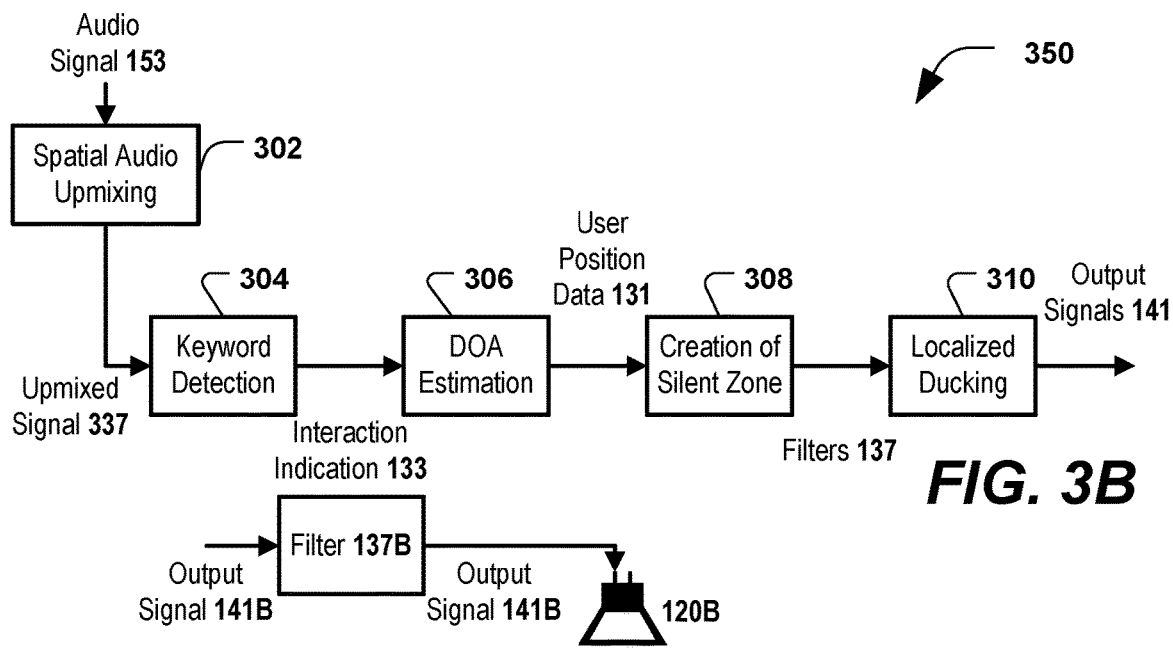
FIG. 3B is another illustrative example of operations that may be performed by the system of FIG. 1.

Referring to FIG. 3B, an example 350 of operations that may be performed by the system 100 of FIG. 1 is shown. The operations of the example 350 differ from the operations of the example 300 of FIG. 3A in that the user-device interaction detector 106 (or another component of the system 100) performs spatial audio upmixing 302 of the audio signal 153 to generate an upmixed signal 337. The user-device interaction detector 106 performs the keyword detection 304 based on the upmixed signal 337. The system 100 thus provides support for legacy systems in which an audio source is not formatted for spatial audio playback.

Figure 3C:
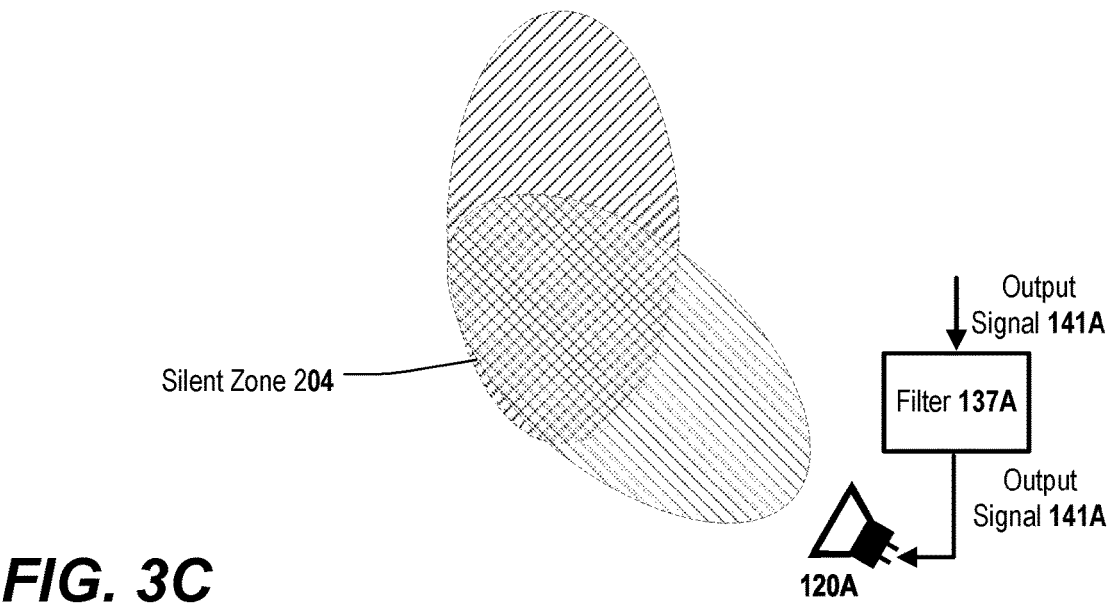
FIG. 3C is an illustrative example of beamforming that may be performed by the system of FIG. 1.

FIG. 3C depicts a simplified visual example of beamforming that may be performed by the system 100 of FIG. 1. For example, the speaker controller 108 provides a first portion of an output signal 141A of FIG. 1 to the speaker 120A and a second portion of an output signal 141B of FIG. 1 to the speaker 120B. In a particular aspect, the first portion of an output signal 141A includes a filtered portion of the output signal 141A that is generated by applying a filter 137A to an unfiltered portion of the output signal 141A. In a particular aspect, the second portion of the output signal 141B includes a filtered portion of the output signal 141B that is generated by applying a filter 137B to an unfiltered portion of the output signal 141B.

In a particular aspect, the speaker controller 108 or the adjustment initiator 134 generates the filter 137A, the filter 137B, or both, using audio techniques (e.g., noise cancelling, beamforming, or both) such that playout of the first portion of the filtered output signal 141A by the speaker 120A reduces (e.g., cancels), in a silent zone 204, sounds generated by playout of the filtered output signal 141B by the speaker 120B.

Figure 4:
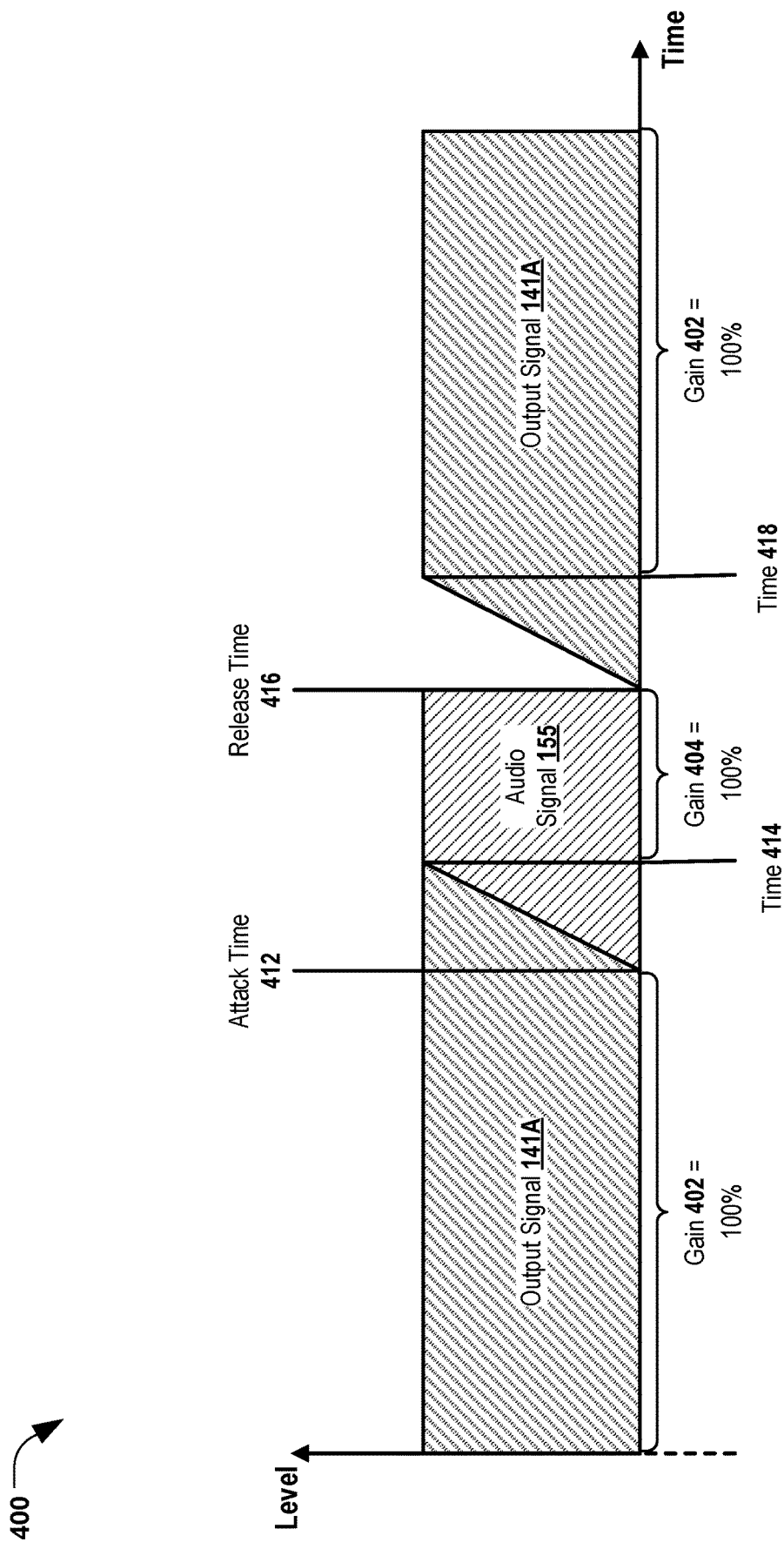
FIG. 4 is an illustrative example of a selective adjustment of playback sound that may be performed by the system of FIG. 1.

Referring to FIG. 4, an example 400 of selective adjustments of the sound playback operation 145 is shown in an implementation in which one or more speaker (e.g., the speaker 120A of FIG. 2A or 2B) performs crossfading between a first audio signal (e.g., an output signal 141A) and a second audio signal (e.g., the audio signal 155) by smoothly transitioning from playing audio associated with the sound playback operation 145 to playing the output sound 165 (e.g., outputting a voice interface message to the user 112 by playing out the audio signal 155), followed by smoothly transitioning back to playing the audio after the output sound 165 has been played. The speaker controller 108 initiates the sound playback operation 145 prior to an attack time 412. For example, the speaker controller 108 provides output signals 141 to the speakers 120 based on the playback signal 151. A first time period prior to the attack time 412 corresponds to a gain 402 (e.g., 100%) applied to the playback signal 151 to generate the output signals 141.

The adjustment initiator 134 initiates, at the attack time 412, the selective adjustment 143 of the sound playback operation 145. For example, during a second time period, between the attack time 412 and a time 414, sound corresponding to the playback signal 151 is gradually reduced in a silent zone 204. In a particular aspect, the second time period corresponds to a reducing gain 402 being applied to the output signal 141A and an increasing gain 404 being applied to the audio signal 155 for output by the speaker 120A. For example, gradually decreasing the gain 402 of the output signal 141A of FIG. 1 decreases a level of sound corresponding to the playback signal 151 output by the speaker 120A and gradually increasing the gain 404 being applied to the audio signal 155 increases a level of the output sound 165 corresponding the audio signal 155 output by the speaker 120A.

In a particular example, the audio signal 155, in addition to including a voice interface message of the audio interface device 104, also includes sound to perform destructive interference with sound projected by the speaker 120B. In another example, a speaker 120D outputs a filtered portion of the output signal 141D that performs destructive interference with sound projected by the speaker 120B while the speaker 120A outputs the audio signal 155.

The adjustment initiator 134 continues the selective adjustment 143 of the sound playback operation 145 during a third time period between the time 414 and a release time 416. For example, during the third time period, sound corresponding to the playback signal 151 output by the speaker 120A is reduced (e.g., no sound). In a particular aspect, the third time period corresponds to a low gain 402 (e.g., 0%) being applied to the playback signal 151 and a high gain 404 (e.g., 100%) being applied to the audio signal 155 for output by the speaker 120A.

The adjustment initiator 134 gradually reverts the selective adjustment 143 of the sound playback operation 145 during a fourth time period between the release time 416 and a time 418. For example, during a fourth time period sound corresponding to the playback signal 151 output by the speaker 120A is gradually increased. In a particular aspect, the fourth time period corresponds to an increasing gain 402 being applied to the playback signal 151 and a low gain 404 (e.g., 0%) being applied to the audio signal 155 for output by the speaker 120A. For example, gradually increasing the gain 402 of the output signal 141A of FIG. 1 increases a level of sound corresponding to the playback signal 151 output by the speaker 120A after the audio signal 155 has been played by the speaker 120A.

The adjustment initiator 134 fully reverts the selective adjustment 143 of the sound playback operation 145 at the time 418. For example, during a fifth time period, subsequent to the time 418, sound corresponding to the playback signal 151 is fully returned. In a particular aspect, the fifth time period corresponds to a high gain 402 (e.g., 110%) being applied to the output signal 141A for output by the speaker 120A.

Figure 5A:
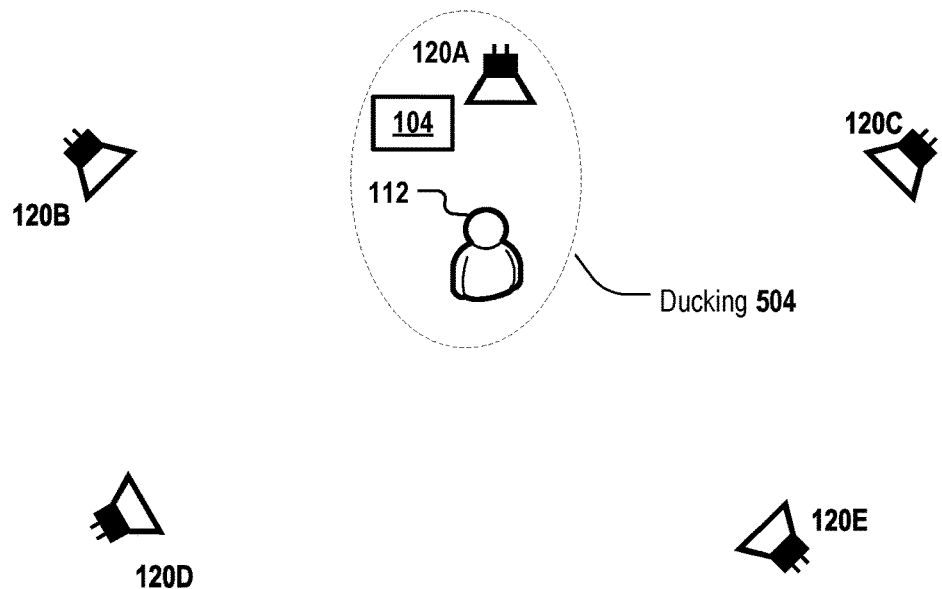
FIG. 5A is an illustrative example of a selective adjustment of playback sound that may be performed by the system of FIG. 1.
Figure 5B:
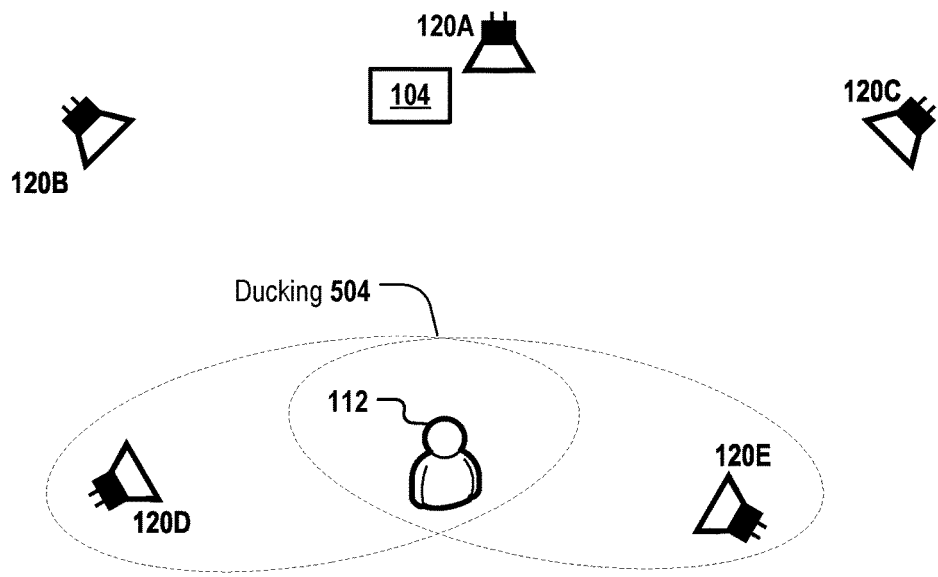
FIG. 5B is an illustrative example of a selective adjustment of playback sound that may be performed by the system of FIG. 1.

Referring to FIGS. 5A-5B, examples of creation of silent zones resulting from the selective adjustment 143 are shown that may be performed by the system 100 of FIG. 1. In FIGS. 5A-5B, the selective adjustment 143 includes initiating a ducking 504. For example, the ducking 504 includes deactivating (e.g., turning off the volume of) one or more of the speakers 120 that are closest in proximity to the position of the user 112 as indicated by the user position data 131, a position of the audio interface device 104, or both.

In FIG. 5A, the position of the user 112 is sufficiently close to the speaker 120A that audio playback from the speaker 120A is likely to interfere with the user 112's ability to understand audio output from the audio interface device 104 (e.g., a voice interface message from the audio interface device 104), while the speakers 120B-E are sufficiently distant from the user 112 to be unlikely to interfere with the user 112's ability to understand the audio output from the audio interface device 104. The adjustment initiator 134, based on determining that the position of the user 112 as indicated by the user position data 131 is within a threshold of (e.g., less than a threshold distance from) a position of the speaker 120A, initiates the selective adjustment 143 to deactivate (e.g., turn off a volume of) the speaker 120A. For example, the adjustment initiator 134 sends, to the speaker controller 108, the request 135 indicating that the speaker 120A is to be deactivated. The speaker controller 108, in response to receiving the request 135 indicating the speaker 120A, deactivates the speaker 120A.

In FIG. 5B, the position of the user 112 is sufficiently close to the speaker 120D and the speaker 120E that audio playback from the speaker 120D and the speaker 120E is likely to interfere with the user 112's ability to understand audio output from the audio interface device 104 (e.g., a voice interface message from the audio interface device 104), while the speakers 120A-C are sufficiently distant from the user 112 to be unlikely to interfere with the user 112's ability to understand the audio output from the audio interface device 104. The adjustment initiator 134, in response to determining that the position of the user 112 is within a threshold of a position of the speaker 120D and also within the threshold of a position of the speaker 120E, initiates the selective adjustment 143 to deactivate (e.g., turn off a volume of) the speaker 120D and the speaker 120E. For example, the adjustment initiator 134 sends, to the speaker controller 108, the request 135 indicating that the speaker 120D and the speaker 120E are to be deactivated. The speaker controller 108, in response to receiving the request 135 indicating the speaker 120D and the speaker 120E, deactivates the speaker 120D and the speaker 120E.

Figure 6:
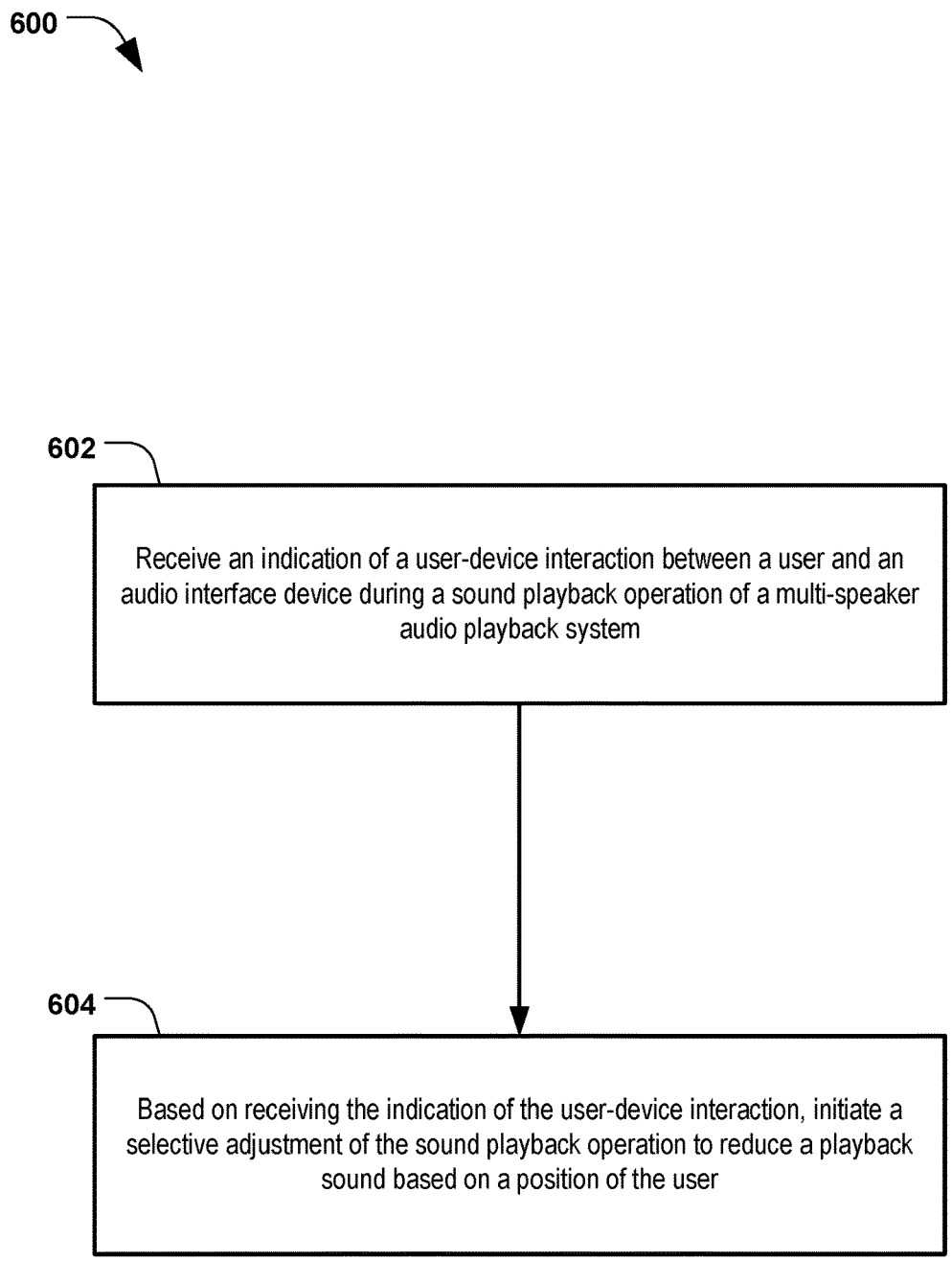
FIG. 6 is a flowchart illustrating a method of selective adjustment of sound playback.

Referring to FIG. 6, a method of performing selective adjustment of sound playback is shown and generally designated 600. In a particular aspect, one or more operations of the method 600 are performed by the adjustment initiator 134, the processor 130, the device 102, the system 100 of FIG. 1, or a combination thereof.

The method 600 includes receiving an indication of a user-device interaction between a user and an audio interface device during a sound playback operation of a multi-speaker audio playback system, at 602. For example, the adjustment initiator 134 of FIG. 1 receives the interaction indication 133 indicating that a user-device interaction is detected between the user 112 and the audio interface device 104 during the sound playback operation 145 of the multi-speaker audio playback system 136, such as described with reference to FIG. 1.

The method 600 also includes, based on receiving the indication of the user-device interaction, initiating a selective adjustment of the sound playback operation to reduce a playback sound based on a position of the user, at 604. For example, the adjustment initiator 134 of FIG. 1, based on receiving the interaction indication 133, initiates the selective adjustment 143 of the sound playback operation 145 to reduce a playback sound based on the user position data 131, such as described with reference to one or more of the various examples depicted in FIGS. 1-5.

The method 600 thus improves user experience of the user 112 of FIG. 1 by reducing interference in the operation of the audio interface device 104 by the sound playback operation 145 without impacting a listening experience of the user 114. For example, the user 112 has an improved user experience (e.g., with reduced interference) while interacting with the audio interface device 104 without substantially impacting the listening experience of the user 114.

Figure 7:
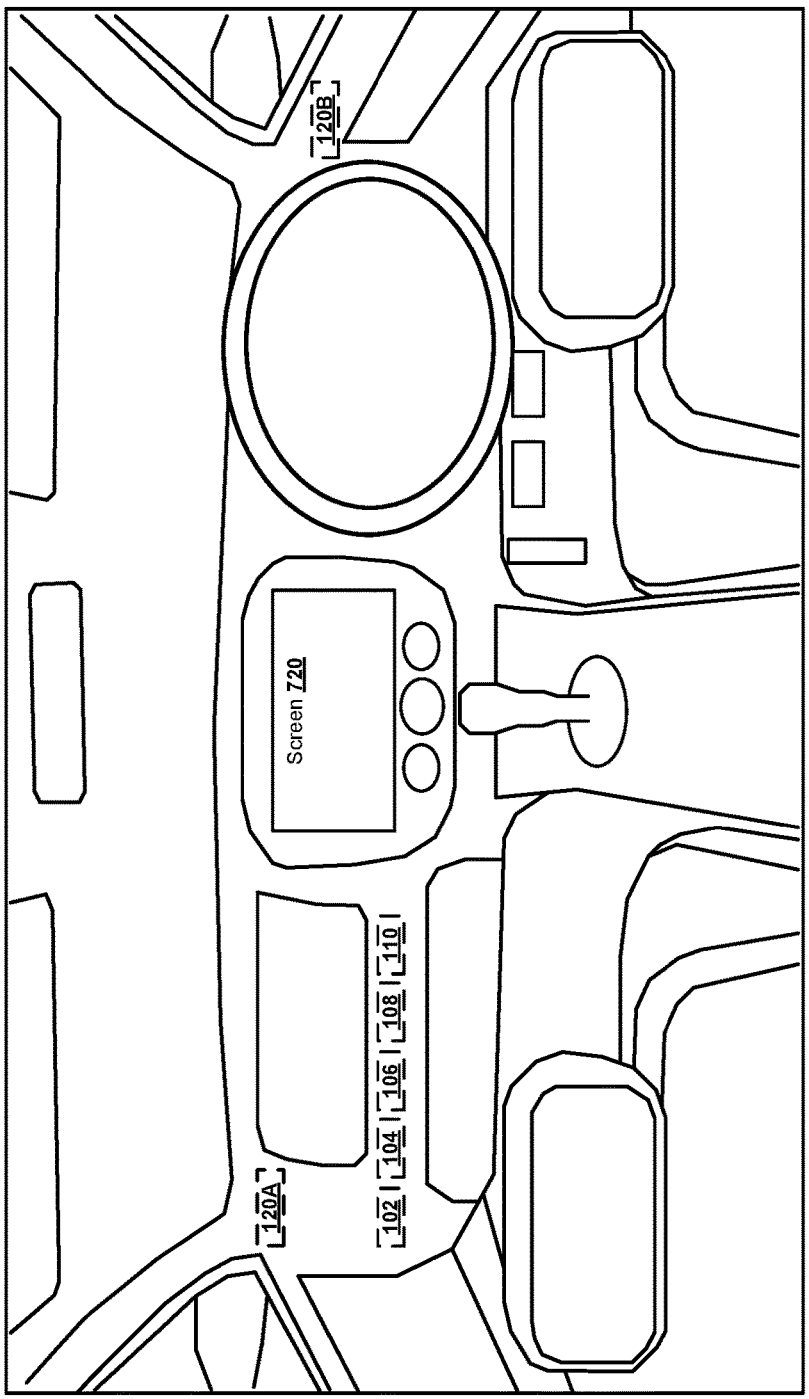
FIG. 7 is an illustrative example of a vehicle that incorporates aspects of the system of FIG. 1.

FIG. 7 is an illustrative example of a vehicle 700. According to one implementation, the vehicle 700 is a self-driving car. According to other implementations, the vehicle 700 can be a car, a truck, a motorcycle, an aircraft, a water vehicle, etc. The vehicle 700 includes a screen 720 (e.g., a display), the speakers 120, the device 102, the audio interface device 104, the user-device interaction detector 106, the speaker controller 108, the user position detector 110, or a combination thereof. The speakers 120, the device 102, the audio interface device 104, the user-device interaction detector 106, the speaker controller 108, and the user position detector 110 are shown using a dashed line to indicate that these components might not be visible to occupants of the vehicle 700. The device 102, the audio interface device 104, the user-device interaction detector 106, the speaker controller 108, the user position detector 110, or a combination thereof, can be integrated into the vehicle 700 or coupled to the vehicle 700.

In a particular aspect, the device 102, the audio interface device 104, the user-device interaction detector 106, the speaker controller 108, the user position detector 110, or a combination thereof, are coupled to the screen 720 and provide an output to the screen 720 responsive to detecting various events described herein. For example, the user-device interaction detector 106 provides a first output to the screen 720 indicating that a user-device interaction is detected. As another example, the adjustment initiator 134 provides a second output to the screen 720 indicating that selective adjustment 143 of the sound playback operation 145 is being performed.

In a particular aspect, the adjustment initiator 134 performs selective adjustment of the sound playback operation 145 to enable one occupant of the vehicle 700 to interact with the audio interface device 104 (e.g., a navigation device, an automated voice assistant, or both) without interfering with a listening experience of other occupants of the vehicle 700. The vehicle 700 may have multiple microphones or cameras, one at each occupant position, used to detect a user position of a user interacting with (e.g., speaking to) the audio interface device 104. In some examples, the adjustment initiator 134 can initiate ducking or creating of silent zones for multiple occupants of the vehicle 700 that are separately interacting with the audio interface device 104 while sound playback for the remaining occupants is substantially unaffected.

Thus, the techniques described with respect to FIGS. 1-6 enable selective adjustment of the sound playback operation 145 of the vehicle 700 to reduce interference in the operation of the audio interface device 104.

Figure 8:
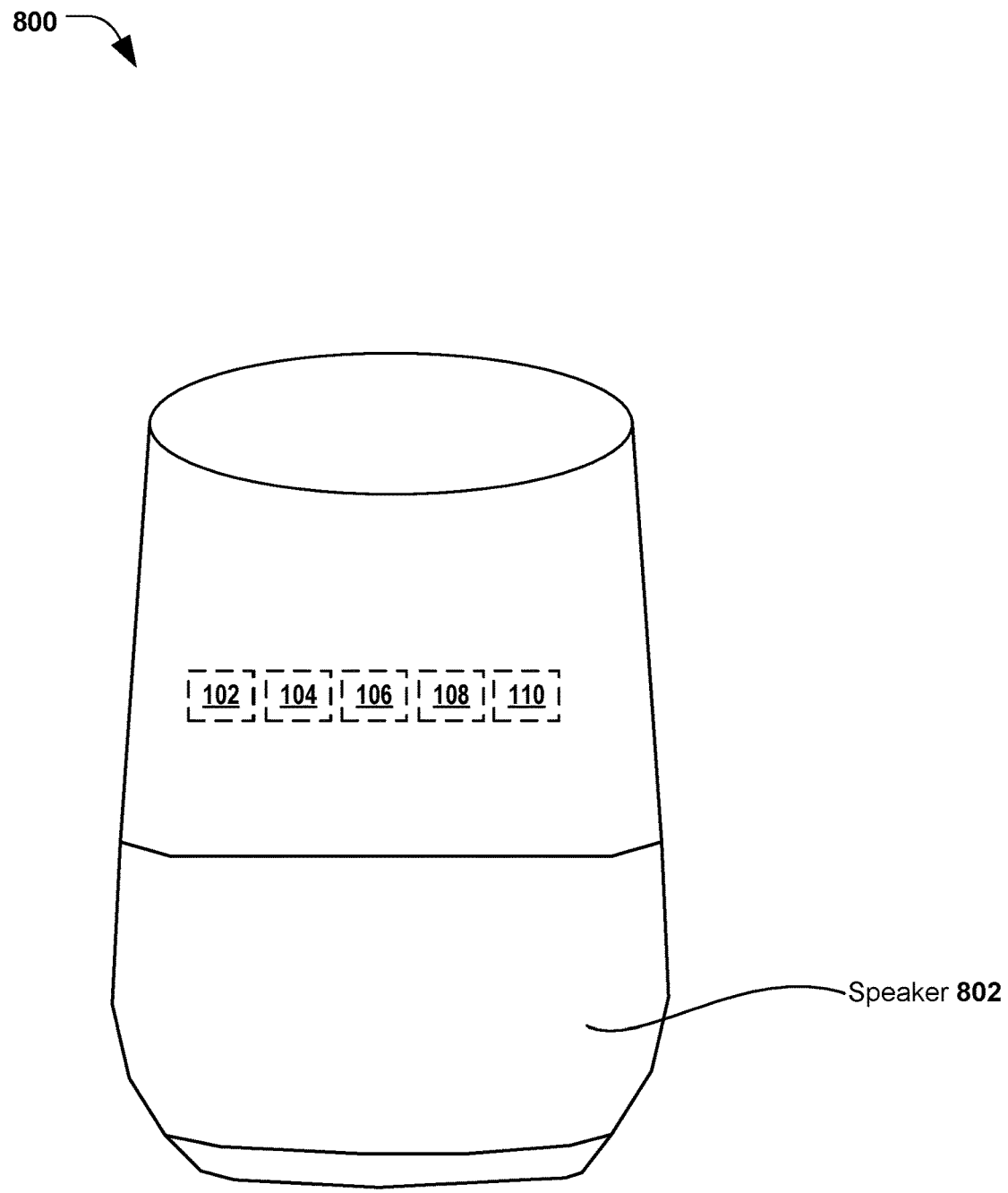
FIG. 8 is an illustrative example of a voice-controlled speaker system that incorporates aspects of the system of FIG. 1.

FIG. 8 is an illustrative example of a voice-controlled speaker system 800. The voice-controlled speaker system 800 can have wireless network connectivity and is configured to execute an assistant operation. The device 102, the audio interface device 104, the user-device interaction detector 106, the speaker controller 108, the user position detector 110, or a combination thereof, are included in the voice-controlled speaker system 800. The voice-controlled speaker system 800 also includes a speaker 802. In a particular aspect, the speaker 802 corresponds to a speaker 120 of FIG. 1. During operation, in response to receiving a verbal command, the voice-controlled speaker system 800 can execute assistant operations. The assistant operations can include adjusting a temperature, playing music, turning on lights, etc. In a particular aspect, the voice-controlled speaker system 800 corresponds to the audio interface device 104. In a particular aspect, the voice-controlled speaker system 800 performs selective adjustment of a sound playback operation to reduce interference in the operation of the audio interface device 104. In a particular example, the voice-controlled speaker system 800 performs cross-fading of the playback signal 151 (e.g., music playback) and the audio signal 155 (e.g., voice assistant audio), as described with reference to FIG. 4.

Figure 9:
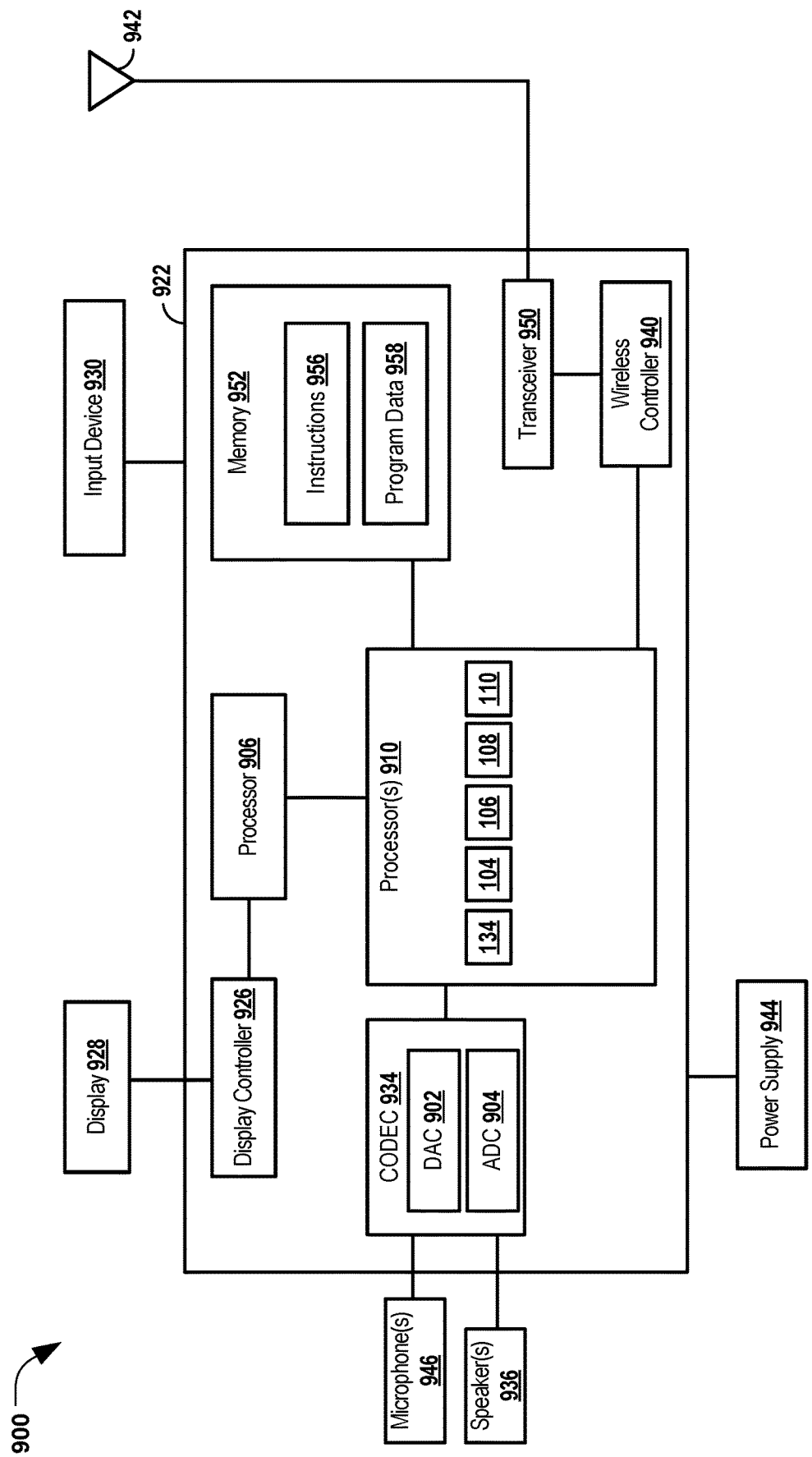
FIG. 9 is a block diagram of an illustrative example of a device that incorporates aspects of the system of FIG. 1.

Referring to FIG. 9, a block diagram of a particular illustrative implementation of a device is depicted and generally designated 900. In various implementations, the device 900 may have more or fewer components than illustrated in FIG. 9. In an illustrative implementation, the device 900 corresponds to the device 102, the audio interface device 104, the user-device interaction detector 106, the speaker controller 108, the user position detector 110 of FIG. 1, or a combination thereof. In an illustrative implementation, the device 900 may perform one or more operations described with reference to FIGS. 1-8.

In a particular implementation, the device 900 includes a processor 906 (e.g., a central processing unit (CPU)). The device 900 may include one or more additional processors 910 (e.g., one or more DSPs). The processor 910 may include the audio interface device 104, the user-device interaction detector 106, the speaker controller 108, the user position detector 110, the adjustment initiator 134, or a combination thereof. In a particular aspect, the processor 130 of FIG. 1 corresponds to the processor 906, the processor 910, or a combination thereof.

The device 900 may include a memory 952 and a CODEC 934. The memory 952 may include instructions 956 that are executable by the one or more additional processors 910 (or the processor 906) to implement one or more operations described with reference to FIGS. 1-8. In an example, the memory 952 corresponds to the memory 132 of FIG. 1 and includes a computer-readable storage device that stores the instructions 956. The instructions 956, when executed by one or more processors (e.g., the processor 130, the processor 906, or the processor 910, as illustrative examples), cause the one or more processors to receive an indication of a user-device interaction between a user and an audio interface device during a sound playback operation of a multi-speaker audio playback system. The instructions 956, when executed by the one or more processors, also cause the one or more processors to, based on receiving the indication of the user-device interaction, initiate a selective adjustment of the sound playback operation to reduce a playback sound based on a position of the user.

The memory 952 may include program data 958. In a particular aspect, the program data 958 includes or indicates the filters 137, the playback signal 151, the interaction indication 133, the user position data 131, the request 135, or a combination thereof. The device 900 may include a wireless controller 940 coupled, via a transceiver 950, to an antenna 942. The device 900 may include a display 928 coupled to a display controller 926.

One or more speakers 936 and one or more microphones 946 may be coupled to the CODEC 934. In a particular aspect, the speaker 936 includes the speakers 120 of FIG. 1, the speaker 802 of FIG. 8, or a combination thereof. In a particular aspect, the microphone 946 includes the microphone 124 of FIG. 1. The CODEC 934 may include a digital-to-analog converter 902 and an analog-to-digital converter 904. In a particular implementation, the CODEC 934 may receive analog signals from the microphone 946, convert the analog signals to digital signals using the analog-to-digital converter 904, and provide the digital signals to the processor 910. The processor 910 (e.g., a speech and music codec) may process the digital signals, and the digital signals may further be processed by the audio interface device 104, the user-device interaction detector 106, the user position detector 110, the adjustment initiator 134, or a combination thereof. In a particular implementation, the processor 910 (e.g., the speech and music codec) may provide digital signals to the CODEC 934. The CODEC 934 may convert the digital signals to analog signals using the digital-to-analog converter 902 and may provide the analog signals to the speakers 936. The device 900 may include an input device 930. In a particular aspect, the input device 930 includes the camera 122 of FIG. 1.

In a particular implementation, the device 900 may be included in a system-in-package or system-on-chip device 922. In a particular implementation, the memory 952, the processor 906, the processor 910, the display controller 926, the CODEC 934, the wireless controller 940, and the transceiver 950 are included in a system-in-package or system-on-chip device 922. In a particular implementation, the input device 930 and a power supply 944 are coupled to the system-in-package or system-on-chip device 922. Moreover, in a particular implementation, as illustrated in FIG. 9, the display 928, the input device 930, the speaker 936, the microphone 946, the antenna 942, and the power supply 944 are external to the system-in-package or system-on-chip device 922. In a particular implementation, each of the display 928, the input device 930, the speaker 936, the microphone 946, the antenna 942, and the power supply 944 may be coupled to a component of the system-in-package or system-on-chip device 922, such as an interface or a controller.

The device 900 may include a voice-activated device, an audio device, a wireless speaker and voice activated device, a portable electronic device, a car, a vehicle, a computing device, a communication device, an internet-of-things (IoT) device, a virtual reality (VR) device, an augmented reality (AR) device, a smart speaker, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, or any combination thereof. In a particular aspect, the processor 906, the processor 910, or a combination thereof, are included in an integrated circuit.

In conjunction with the described implementations, an apparatus includes means for receiving an indication of a user-device interaction between a user and an audio interface device during a sound playback operation of a multi-speaker audio playback system. For example, the means for receiving includes the user-device interaction detector 106, the device 102, the processor 130, the adjustment initiator 134, the system 100 of FIG. 1, the processor 906, the processor 910, one or more other circuits or components configured to receive an indication of a user-device interaction, or any combination thereof.

The apparatus also includes means for initiating a selective adjustment of the sound playback operation to reduce a playback sound based on a position of the user, the selective adjustment initiated based on receiving the indication of the user-device interaction. For examples, the means for initiating a selective adjustment includes the adjustment initiator 134, the speaker controller 108, the device 102, the processor 130, the system 100 of FIG. 1, the processor 906, the processor 910, one or more other circuits or components configured to initiate a selective adjustment of a sound playback operation, or any combination thereof.

Figure 10:
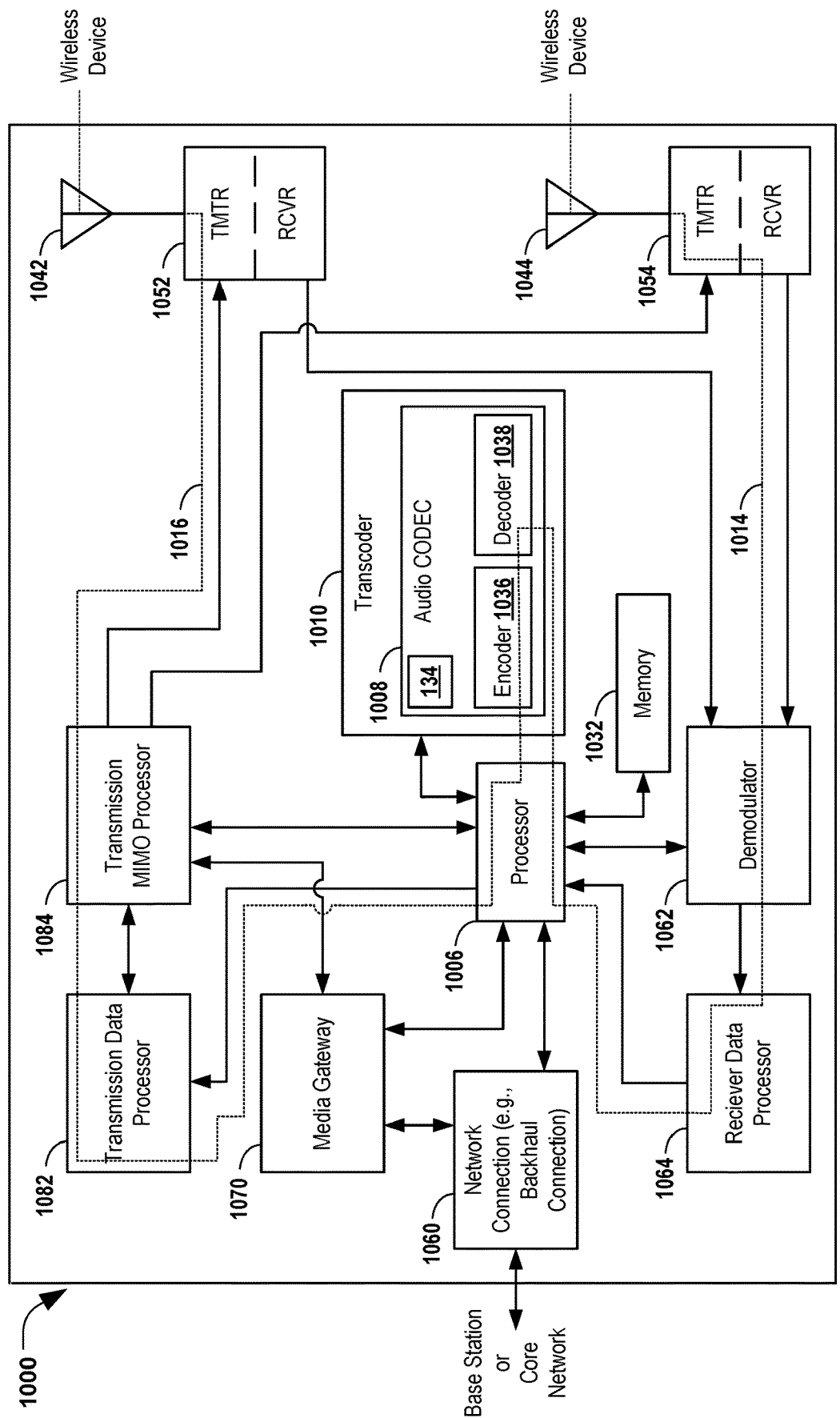
FIG. 10. is a block diagram of a base station that incorporates aspects of the system of FIG. 1.

Referring to FIG. 10, a block diagram of a particular illustrative example of a base station 1000 (e.g., a base station device) is depicted. In various implementations, the base station 1000 may have more components or fewer components than illustrated in FIG. 10. In an illustrative example, the base station 1000 may include the device 102, the audio interface device 104, the user-device interaction detector 106, the speaker controller 108, the user position detector 110, or a combination thereof. In an illustrative example, the base station 1000 may operate according to one or more of the methods or systems described with reference to FIGS. 1-9.

The base station 1000 may be part of a wireless communication system. The wireless communication system may include multiple base stations and multiple wireless devices. The wireless communication system may be a Long Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1x, Evolution-Data Optimized (EVDO), Time Division Synchronous CDMA (TD-SCDMA), or some other version of CDMA.

The wireless devices may also be referred to as user equipment (UE), a mobile station, a terminal, an access terminal, a subscriber unit, a station, etc. The wireless devices may include a cellular phone, a smartphone, a tablet, a wireless modem, a personal digital assistant (PDA), a handheld device, a laptop computer, a smartbook, a netbook, a tablet, a cordless phone, a wireless local loop (WLL) station, a Bluetooth device, etc. The wireless devices may include or correspond to the device 900 of FIG. 9.

Various functions may be performed by one or more components of the base station 1000 (and/or in other components not shown), such as sending and receiving messages and data (e.g., audio data). In a particular example, the base station 1000 includes a processor 1006 (e.g., a CPU). The base station 1000 may include a transcoder 1010. The transcoder 1010 may include an audio CODEC 1008. For example, the transcoder 1010 may include one or more components (e.g., circuitry) configured to perform operations of the audio CODEC 1008. As another example, the transcoder 1010 may be configured to execute one or more computer-readable instructions to perform the operations of the audio CODEC 1008. Although the audio CODEC 1008 is illustrated as a component of the transcoder 1010, in other examples one or more components of the audio CODEC 1008 may be included in the processor 1006, another processing component, or a combination thereof. For example, a decoder 1038 (e.g., a vocoder decoder) may be included in a receiver data processor 1064. As another example, an encoder 1036 (e.g., a vocoder encoder) may be included in a transmission data processor 1082.

The transcoder 1010 may function to transcode messages and data between two or more networks. The transcoder 1010 may be configured to convert message and audio data from a first format (e.g., a digital format) to a second format. To illustrate, the decoder 1038 may decode encoded signals having a first format and the encoder 1036 may encode the decoded signals into encoded signals having a second format. Additionally or alternatively, the transcoder 1010 may be configured to perform data rate adaptation. For example, the transcoder 1010 may downconvert a data rate or upconvert the data rate without changing a format the audio data. To illustrate, the transcoder 1010 may downconvert 64 kilobit per second (Kbit/s) signals into 16 Kbit/s signals. The audio CODEC 1008 may include the encoder 1036 and the decoder 1038. In a particular aspect, the audio CODEC 1008 includes the adjustment initiator 134.

The base station 1000 may include a memory 1032. The memory 1032, such as a computer-readable storage device, may include instructions. The instructions may include one or more instructions that are executable by the processor 1006, the transcoder 1010, or a combination thereof, to perform one or more operations described with reference to the methods and systems of FIGS. 1-9. The base station 1000 may include multiple transmitters and receivers (e.g., transceivers), such as a first transceiver 1052 and a second transceiver 1054, coupled to an array of antennas. The array of antennas may include a first antenna 1042 and a second antenna 1044. The array of antennas may be configured to wirelessly communicate with one or more wireless devices, such as the device 900 of FIG. 9. For example, the second antenna 1044 may receive a data stream 1014 (e.g., a bit stream) from a wireless device. The data stream 1014 may include messages, data (e.g., encoded speech data), or a combination thereof.

The base station 1000 may include a network connection 1060, such as backhaul connection. The network connection 1060 may be configured to communicate with a core network or one or more base stations of the wireless communication network. For example, the base station 1000 may receive a second data stream (e.g., messages or audio data) from a core network via the network connection 1060. The base station 1000 may process the second data stream to generate messages or audio data and provide the messages or the audio data to one or more wireless device via one or more antennas of the array of antennas or to another base station via the network connection 1060. In a particular implementation, the network connection 1060 may be a wide area network (WAN) connection, as an illustrative, non-limiting example. In some implementations, the core network may include or correspond to a Public Switched Telephone Network (PSTN), a packet backbone network, or both.

The base station 1000 may include a media gateway 1070 that is coupled to the network connection 1060 and the processor 1006. The media gateway 1070 may be configured to convert between media streams of different telecommunications technologies. For example, the media gateway 1070 may convert between different transmission protocols, different coding schemes, or both. To illustrate, the media gateway 1070 may convert from PCM signals to Real-Time Transport Protocol (RTP) signals, as an illustrative, non-limiting example. The media gateway 1070 may convert data between packet switched networks (e.g., a Voice Over Internet Protocol (VoIP) network, an IP Multimedia Subsystem (IMS), a fourth generation (4G) wireless network, such as LTE, WiMAX, and UMB, etc.), circuit switched networks (e.g., a PSTN), and hybrid networks (e.g., a second generation (2G) wireless network, such as GSM, GPRS, and EDGE, a third generation (3G) wireless network, such as WCDMA, EV-DO, and HSPA, etc.).

Additionally, the media gateway 1070 may include a transcoder, such as the transcoder 1010, and may be configured to transcode data when codecs are incompatible. For example, the media gateway 1070 may transcode between an Adaptive Multi-Rate (AMR) codec and a G.911 codec, as an illustrative, non-limiting example. The media gateway 1070 may include a router and a plurality of physical interfaces. In some implementations, the media gateway 1070 may also include a controller (not shown). In a particular implementation, the media gateway controller may be external to the media gateway 1070, external to the base station 1000, or both. The media gateway controller may control and coordinate operations of multiple media gateways. The media gateway 1070 may receive control signals from the media gateway controller and may function to bridge between different transmission technologies and may add service to end-user capabilities and connections.

The base station 1000 may include a demodulator 1062 that is coupled to the transceivers 1052, 1054, the receiver data processor 1064, and the processor 1006, and the receiver data processor 1064 may be coupled to the processor 1006. The demodulator 1062 may be configured to demodulate modulated signals received from the transceivers 1052, 1054 and to provide demodulated data to the receiver data processor 1064. The receiver data processor 1064 may be configured to extract a message or audio data from the demodulated data and send the message or the audio data to the processor 1006.

The base station 1000 may include a transmission data processor 1082 and a transmission multiple input-multiple output (MIMO) processor 1084. The transmission data processor 1082 may be coupled to the processor 1006 and the transmission MIMO processor 1084. The transmission MIMO processor 1084 may be coupled to the transceivers 1052, 1054 and the processor 1006. In some implementations, the transmission MIMO processor 1084 may be coupled to the media gateway 1070. The transmission data processor 1082 may be configured to receive the messages or the audio data from the processor 1006 and to code the messages or the audio data based on a coding scheme, such as CDMA or orthogonal frequency-division multiplexing (OFDM), as an illustrative, non-limiting examples. The transmission data processor 1082 may provide the coded data to the transmission MIMO processor 1084.

The coded data may be multiplexed with other data, such as pilot data, using CDMA or OFDM techniques to generate multiplexed data. The multiplexed data may then be modulated (i.e., symbol mapped) by the transmission data processor 1082 based on a particular modulation scheme (e.g., Binary phase-shift keying ("BPSK"), Quadrature phase-shift keying ("QSPK"), M-ary phase-shift keying ("M-PSK"), M-ary Quadrature amplitude modulation ("M-QAM"), etc.) to generate modulation symbols. In a particular implementation, the coded data and other data may be modulated using different modulation schemes. The data rate, coding, and modulation for each data stream may be determined by instructions executed by processor 1006.

The transmission MIMO processor 1084 may be configured to receive the modulation symbols from the transmission data processor 1082 and may further process the modulation symbols and may perform beamforming on the data. For example, the transmission MIMO processor 1084 may apply beamforming weights to the modulation symbols.

The beamforming weights may correspond to one or more antennas of the array of antennas from which the modulation symbols are transmitted.

During operation, the second antenna 1044 of the base station 1000 may receive a data stream 1014. The second transceiver 1054 may receive the data stream 1014 from the second antenna 1044 and may provide the data stream 1014 to the demodulator 1062. The demodulator 1062 may demodulate modulated signals of the data stream 1014 and provide demodulated data to the receiver data processor 1064. The receiver data processor 1064 may extract audio data from the demodulated data and provide the extracted audio data to the processor 1006.

The processor 1006 may provide the audio data to the transcoder 1010 for transcoding. The decoder 1038 of the transcoder 1010 may decode the audio data from a first format into decoded audio data and the encoder 1036 may encode the decoded audio data into a second format. In some implementations, the encoder 1036 may encode the audio data using a higher data rate (e.g., upconvert) or a lower data rate (e.g., downconvert) than received from the wireless device. In other implementations the audio data may not be transcoded. Although transcoding (e.g., decoding and encoding) is illustrated as being performed by a transcoder 1010, the transcoding operations (e.g., decoding and encoding) may be performed by multiple components of the base station 1000. For example, decoding may be performed by the receiver data processor 1064 and encoding may be performed by the transmission data processor 1082. In other implementations, the processor 1006 may provide the audio data to the media gateway 1070 for conversion to another transmission protocol, coding scheme, or both. The media gateway 1070 may provide the converted data to another base station or core network via the network connection 1060.

The adjustment initiator 134 may receive the interaction indication 133 and the user position data 131. The adjustment initiator 134 may initiate the selective adjustment 143. For example, the adjustment initiator 134 may generate the filters 137. In a particular example, the encoder 1036 may generate encoded audio data based on the filters 137. Encoded audio data generated at the encoder 1036, such as transcoded data, may be provided to the transmission data processor 1082 or the network connection 1060 via the processor 1006.

The transcoded audio data from the transcoder 1010 may be provided to the transmission data processor 1082 for coding according to a modulation scheme, such as OFDM, to generate the modulation symbols. The transmission data processor 1082 may provide the modulation symbols to the transmission MIMO processor 1084 for further processing and beamforming. The transmission MIMO processor 1084 may apply beamforming weights and may provide the modulation symbols to one or more antennas of the array of antennas, such as the first antenna 1042 via the first transceiver 1052. Thus, the base station 1000 may provide a transcoded data stream 1016, that corresponds to the data stream 1014 received from the wireless device, to another wireless device. The transcoded data stream 1016 may have a different encoding format, data rate, or both, than the data stream 1014. In other implementations, the transcoded data stream 1016 may be provided to the network connection 1060 for transmission to another base station or a core network.

The base station 1000 may include a computer-readable storage device (e.g., the memory 1032) storing instructions that, when executed by a processor (e.g., the processor 1006 or the transcoder 1010), cause the processor to receive an indication of a user-device interaction between a user and an audio interface device during a sound playback operation of a multi-speaker audio playback system. The instructions, when executed by the one or more processors, also cause the one or more processors to, based on receiving the indication of the user-device interaction, initiate a selective adjustment of the sound playback operation to reduce a playback sound based on a position of the user.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device for managing sound playback, the device comprising:
   one or more processors configured to:
      receive an indication of a user-device interaction between a user and an audio interface device during a sound playback operation of a multi-speaker audio playback system; and
      based on receiving the indication of the user-device interaction, initiate a selective adjustment of the sound playback operation to reduce a playback sound of the multi-speaker audio playback system based on a position of the user, wherein the selective adjustment of the sound playback operation refrains from reducing a playback sound at a position of a second user.

2. The device of claim 1, wherein the audio interface device includes a voice-activated device.

3. The device of claim 1, wherein the selective adjustment of the sound playback operation includes reducing a playback sound of one or more first speakers of the multi-speaker audio playback system and refraining from reducing a playback sound of one or more second speakers of the multi-speaker audio playback system.

4. The device of claim 3, wherein reducing the playback sound of the one or more first speakers includes deactivating the one or more first speakers.

5. The device of claim 1, wherein the one or more processors are further configured to detect the position of the user relative to the audio interface device based on a direction of arrival of an audio signal at the audio interface device, and wherein the audio signal corresponds to speech of the user.

6. The device of claim 5, wherein the user-device interaction includes receipt of the speech of the user at the audio interface device.

7. The device of claim 1, wherein the one or more processors are further configured to detect the position of the user based on an image of the user captured by a camera.

8. The device of claim 7, wherein the user-device interaction includes a user gesture indicated in the image.

9. The device of claim 1, wherein the one or more processors are configured to perform the selective adjustment of the sound playback operation by adjusting one or more parameters associated with a portion of audio prior to streaming the portion of audio to the multi-speaker audio playback system.

10. The device of claim 1, wherein the one or more processors are configured to initiate the selective adjustment of the sound playback operation by sending an adjustment request to the multi-speaker audio playback system to perform the selective adjustment of the sound playback operation.

11. The device of claim 10, wherein the adjustment request indicates the position of the user.

12. The device of claim 1, wherein the multi-speaker audio playback system includes a beamforming-capable speaker system or sound bar.

13. The device of claim 1, wherein the audio interface device includes a microphone, a speaker, or both.

14. The device of claim 1, wherein a home automation system includes the audio interface device and the multi-speaker audio playback system.

15. The device of claim 1, wherein the one or more processors are included in an integrated circuit.

16. The device of claim 1, wherein the one or more processors are included in a vehicle.

17. The device of claim 1, wherein the one or more processors are implemented in an audio device, and wherein the audio device includes a wireless speaker and voice activated device with an integrated assistant application.

18. The device of claim 1, further comprising:
an antenna; and
a transceiver coupled to the antenna and configured to receive the indication from the audio interface device, to send a control signal to the multi-speaker audio playback system, or both.

19. The device of claim 18, wherein the one or more processors, the antenna, and the transceiver are integrated into a mobile device.

20. The device of claim 18, wherein the one or more processors, the antenna, and the transceiver are integrated into a base station.

21. A method of sound playback, the method comprising:
receiving, at a device, an indication of a user-device interaction between a user and an audio interface device during a sound playback operation of a multi-speaker audio playback system; and
based on receiving the indication of the user-device interaction, initiating, at the device, a selective adjustment of the sound playback operation to reduce the playback sound based on a position of the user, wherein the selective adjustment of the sound playback operation refrains from reducing a playback sound at a position of a second user.

22. The method of claim 21, wherein the selective adjustment of the sound playback operation reduces a playback sound at a position of the audio interface device.

23. The method of claim 22, further comprising:
generating one or more filters based on the position of the user, the one or more filters configured to reduce the playback sound at the position of the audio interface device, at the position of the user, or both, via beamforming; and
sending the one or more filters to the multi-speaker audio playback system during the sound playback operation.

24. The method of claim 22, further comprising:
applying one or more filters to one or more audio signals to generate one or more filtered audio signals; and
sending the one or more filtered audio signals to one or more first speakers of the multi-speaker audio playback system to reduce the playback sound at the position of the audio interface device, at the position of the user, or both, via beamforming.

25. A computer-readable storage device storing instructions that, when executed by one or more processors, cause the one or more processors to:
receive an indication of a user-device interaction between a user and an audio interface device during a sound playback operation of a multi-speaker audio playback system; and
based on receiving the indication of the user-device interaction, initiate a selective adjustment of the sound playback operation to reduce a playback sound of the multi-speaker audio playback system based on a position of the user, wherein the selective adjustment of the sound playback operation refrains from reducing a playback sound at a position of a second user.

26. The computer-readable storage device of claim 25, wherein the instructions, when executed by the one or more processors, further cause the one or more processors to detect the position of the user relative to the audio interface device based on a direction of arrival of an audio signal at the audio interface device.

27. An apparatus comprising:
means for receiving an indication of a user-device interaction between a user and an audio interface device during a sound playback operation of a multi-speaker audio playback system; and
means for initiating a selective adjustment of the sound playback operation to reduce a playback sound based on a position of the user, the selective adjustment initiated based on receiving the indication of the user-device interaction, wherein the selective adjustment of the sound playback operation refrains from reducing a playback sound at a position of a second user.

28. The apparatus of claim 27, wherein the means for receiving the indication of the user-device interaction, and the means for initiating the selective adjustment of the sound playback operation are integrated into at least one of a home automation system, a voice-activated device, a wireless speaker and voice activated device, a portable electronic device, a car, a vehicle, a computing device, a communication device, an internet-of-things (IoT) device, a virtual reality (VR) device, a base station, or a combination thereof.

29. The computer-readable storage device of claim 25, wherein reducing the playback sound of the multi-speaker audio playback system includes deactivating one or more first speakers.

30. The method of claim 21, further comprising detecting the position of the user based on an image of the user captured by a camera.

* * * * *